United States Patent
Jung et al.

(10) Patent No.: US 9,667,917 B2
(45) Date of Patent: *May 30, 2017

(54) LEVEL-ONE ENCRYPTION ASSOCIATED WITH INDIVIDUAL PRIVACY AND PUBLIC SAFETY PROTECTION VIA DOUBLE ENCRYPTED LOCK BOX

(71) Applicant: Elwha LLC, Bellevue, WA (US)

(72) Inventors: Edward K. Y. Jung, Bellevue, WA (US); Royce A. Levien, Lexington, MA (US); Richard T. Lord, Tacoma, WA (US); Robert W. Lord, Seattle, WA (US); Mark A. Malamud, Seattle, WA (US)

(73) Assignee: Elwha, LLC, Bellevue, WA (US)

(*) Notice: Subject to any disclaimer, the term of this patent is extended or adjusted under 35 U.S.C. 154(b) by 680 days.

This patent is subject to a terminal disclaimer.

(21) Appl. No.: 13/677,634

(22) Filed: Nov. 15, 2012

(65) Prior Publication Data

US 2014/0105401 A1 Apr. 17, 2014

Related U.S. Application Data

(63) Continuation of application No. 13/653,222, filed on Oct. 16, 2012, which is a continuation-in-part of application No. 13/385,598, filed on Jul. 12, 2012.

(51) Int. Cl.
| | |
|---|---|
| *G06F 21/76* | (2013.01) |
| *H04N 7/167* | (2011.01) |
| *H04N 7/18* | (2006.01) |
| *H04L 9/08* | (2006.01) |
| *G08B 13/196* | (2006.01) |
| *G06F 21/84* | (2013.01) |
| *H04L 9/14* | (2006.01) |

(52) U.S. Cl.
CPC ..... *H04N 7/1675* (2013.01); *G08B 13/19667* (2013.01); *H04L 9/08* (2013.01); *H04N 7/18* (2013.01); *H04L 9/14* (2013.01); *H04L 2209/38* (2013.01)

(58) Field of Classification Search
CPC ......... G06T 3/0062; G06T 7/20; H04N 5/222; H04N 7/18; H04N 9/3257
See application file for complete search history.

(56) References Cited

U.S. PATENT DOCUMENTS

| | | | |
|---|---|---|---|
| 5,761,311 A | 6/1998 | Spelman et al. | |
| 6,912,514 B2 | 6/2005 | Matsushima et al. | |
| 7,120,252 B1 | 10/2006 | Jones et al. | |
| 7,190,882 B2 | 3/2007 | Gammenthaler | |
| 7,508,941 B1* | 3/2009 | O'Toole et al. | 380/228 |

(Continued)

FOREIGN PATENT DOCUMENTS

| | | |
|---|---|---|
| WO | WO 2006070249 A1 * | 7/2006 |
| WO | WO 2010126644 A2 * | 11/2010 |

OTHER PUBLICATIONS

U.S. Appl. No. 13/653,222, Edward K.Y. Jung et al.

(Continued)

*Primary Examiner* — Venkat Perungavoor

(57) ABSTRACT

A method substantially as shown and described the detailed description and/or drawings and/or elsewhere herein. A device substantially as shown and described the detailed description and/or drawings and/or elsewhere herein.

37 Claims, 24 Drawing Sheets

(56) References Cited

U.S. PATENT DOCUMENTS

| | | | |
|---|---|---|---|
| 7,512,814 | B2 | 3/2009 | Chen et al. |
| 7,549,044 | B2 | 6/2009 | Lee et al. |
| 7,802,723 | B2 | 9/2010 | Petrone et al. |
| 7,822,635 | B1 | 10/2010 | Brown et al. |
| 7,921,450 | B1 | 4/2011 | Vainstein et al. |
| 8,666,110 | B2 * | 3/2014 | Yoo et al. ............... 382/100 |
| 2002/0062451 | A1 | 5/2002 | Scheidt et al. |
| 2002/0131768 | A1 | 9/2002 | Gammenthaler |
| 2002/0138439 | A1 | 9/2002 | Matsushima et al. |
| 2003/0065927 | A1 | 4/2003 | Penner |
| 2003/0085998 | A1 | 5/2003 | Ramirez-Diaz et al. |
| 2003/0115147 | A1 | 6/2003 | Feldman et al. |
| 2004/0153648 | A1 * | 8/2004 | Rotholtz et al. ............. 713/176 |
| 2004/0223614 | A1 | 11/2004 | Seaman |
| 2005/0091491 | A1 | 4/2005 | Lee et al. |
| 2005/0111701 | A1 | 5/2005 | Seki et al. |
| 2005/0182948 | A1 | 8/2005 | Ducharme |
| 2006/0020821 | A1 | 1/2006 | Waltermann et al. |
| 2006/0029228 | A1 | 2/2006 | Lagrange et al. |
| 2006/0101285 | A1 | 5/2006 | Chen et al. |
| 2006/0185023 | A1 | 8/2006 | Sato et al. |
| 2006/0282901 | A1 | 12/2006 | Li et al. |
| 2007/0198839 | A1 | 8/2007 | Carle et al. |
| 2007/0297603 | A1 | 12/2007 | Kamins et al. |
| 2007/0297607 | A1 | 12/2007 | Ogura et al. |
| 2009/0158030 | A1 | 6/2009 | Rasti |
| 2009/0259560 | A1 | 10/2009 | Bachenheimer |
| 2010/0180291 | A1 | 7/2010 | Kahn et al. |
| 2011/0103582 | A1 | 5/2011 | Kamins et al. |
| 2012/0030466 | A1 | 2/2012 | Yamaguchi |
| 2012/0036364 | A1 | 2/2012 | Yoneda et al. |
| 2012/0054485 | A1 * | 3/2012 | Tanaka et al. ............... 713/150 |
| 2012/0108209 | A1 | 5/2012 | Sun |
| 2012/0144208 | A1 | 6/2012 | Kim et al. |
| 2012/0204032 | A1 * | 8/2012 | Wilkins et al. ............... 713/170 |
| 2012/0246075 | A1 | 9/2012 | Rasti |
| 2012/0260094 | A1 | 10/2012 | Asim et al. |
| 2012/0307049 | A1 | 12/2012 | Mimar |
| 2012/0323750 | A1 | 12/2012 | Sivaramakrishnan et al. |
| 2013/0004090 | A1 | 1/2013 | Kundu et al. |
| 2013/0007449 | A1 | 1/2013 | Rangsikitpho et al. |
| 2013/0198829 | A1 | 8/2013 | Bund et al. |
| 2014/0157429 | A1 | 6/2014 | Kinoshita et al. |

OTHER PUBLICATIONS

U.S. Appl. No. 13/660,848, Edward K.Y. Jung et al.
U.S. Appl. No. 13/664,265, Edward K.Y. Jung et al.
Bai et al.; "An Advanced Efficient Secured Blind Authentication and Verification Crypto Protocol"; International Journal of Future Generation Communication and Networking; bearing a date of Sep. 2011; pp. 87-94; vol. 4, No. 3; located at www.sersc.org/journals/IJFGCN/vol4$_{13}$ no3/8.pdf.
Camenisch et al.; Blind and Anonymous Identity-Based Encryption and Authorised Private Searches on Public Key Encrypted Data; total of 19 pages; printed on Oct. 29, 2012; located at http://www.iacr.org/archive/pkc2009/54430202/54430202.pdf.
"Can I encrypt user input in a way I can't decrypt it for a certain period of time?"; stackexchange, Cryptography beta; pp. 1-5; printed on Oct. 29, 2012; located at http://crypto.stackexchange.com/questions/2507/can-i-encrypt-user-input-in-a-way-i-cant-decrypt-it-for-a-certain-period-of-tim.
"Debunking The Myths of Column-level Encryption"; total of 6 pages; bearing a date of 2012; printed on Oct. 29,2012; Vormetric, Inc.; located at http://www.vormetric.com/resources/white-papers/wp-myths-of-column-level-encryption.pdf.
Doukas et al.; "A Blind Source Separation Based Cryptography Scheme for Mobile Military Communication Applications"; WSEAS Transactions on Communications; bearing a date of Dec. 2008; pp. 1235-1245; Issue 12, vol. 7; located at http://www.academia.edu/413382/_J19_._A_Blind_Source_Separation_Based_Cryptography_Scheme_for_Mobile_Military_Communication_Applications.
Gallegos-Garcia et al.; Identity based Threshold Cryptography and Blind Signatures for Electronic Voting; bearing a date of Jan. 2010; pp. 62-71; Issue 1, vol. 9; WSEAS Transactions on Computers; located at http://www.wseas.us/e-library/transactions/computers/2010/89-164.pdf.
Khiyal et al.; Dynamic Blind Group Digital Signature Scheme in E-Banking; International Journal of Computer and Electrical Engineering; bearing a date of Aug. 2011; pp. 514-519; vol. 3, No. 4; located at: www.ijcee.org/papers/371-E959.pdf.
Kwon et al.; "Protecting Secret Keys with Blind Computation Service"; printed on Oct. 29, 2012; pp. 1-11; Seoul National University; Seoul, Korea; located at http://citeseerx.ist.psu.edu/viewdoc/summary?doi=10.1.1.19.1902.
Lorimer, William R.; "Double Blind Comparisons: A New Approach to the Database Aggregation Problem": bearing a date of May 16, 2011; printed on Oct. 29, 2012; total of 2 pages; Computer Science > Cryptography and Security, Cornell University Library; located at http://arxiv.org/abs/1105.3239.
Motro et al.; "Blind Custodians: A Database Service Architecture that Supports Privacy without Encryption"; bearing a date of 2005; pp. 338-352; vol.—issue No. LNCS 3654; IFIP International Federation for Information Processing; located at: http://cs.gmu.edu/~ami/research/publications/pdf/dbsec05.pdf.
Motro et al.; "Blind Custodians: a database service architecture that supports privacy without encryption"; ACM Digital Library; printed on Oct. 30, 2012; total of 2 pages; George Mason University; Springer-Verlag Berlin, Heidelberg; located at http://dl.acm.org/citation.cfm?id=2138957.
"Proofpoint DoubleBlind™ Key Architecture"; bearing a date of 2012; printed on Oct. 29, 2012; total of 2 pages; ProofPoint, Inc.; Sunnyvale, CA; located at http://www.proofpoint.com/datasheets/email-archiving/DS-Proofpoint-DoubleBlind-Key-Architecture.pdf.
"Proofpoint Enterprise Archive: DoubleBlind™ Key Architecture"; printed on Oct. 30, 2012; total of 2 pages; located at http://www.proofpoint.com/products/archive/doubleblind-key-architecture.php.
Schonberg et al.; "On Blind Compression of Encrypted Correlated Data Approaching The Source Entropy Rate*"; total of 10 pages; printed on Oct. 29, 2012; U. of California, Berkeley; located at http://sdraper.ece.wisc.edu/researchDir/pdf/allerton05_encrypt.pdf.
Slik, David; "Vanishing Into the Infrastructure"; bearing a date of Jun. 29, 2009; printed on Oct. 29, 2012; total of 3 pages; Blogspot; located at http://intotheinfrastructure.blogspot.com/2009/06/where-does-encryption-fit-in-cloud.html.
Troncoso-Pastoriza et al.; "Videosurveillance and privacy: covering the two sides of the mirror with DRM"; DRM '09; Nov. 6, 2009; 12 pages; ACM.

* cited by examiner

Fig. 1H
| Fig.1H-A | Fig.1H-B | Fig.1H-C |
| Fig.1H-D | Fig.1H-E | Fig.1H-F |
| Fig.1H-G | Fig.1H-H | Fig.1H-I |
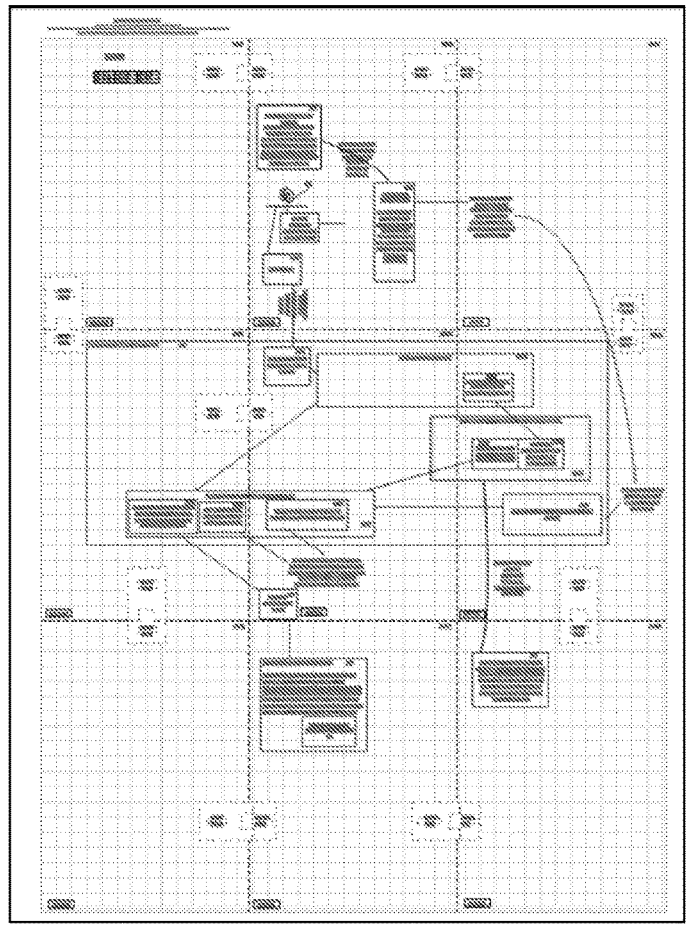
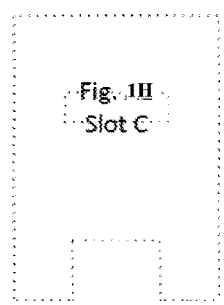
Fig. 1H-A

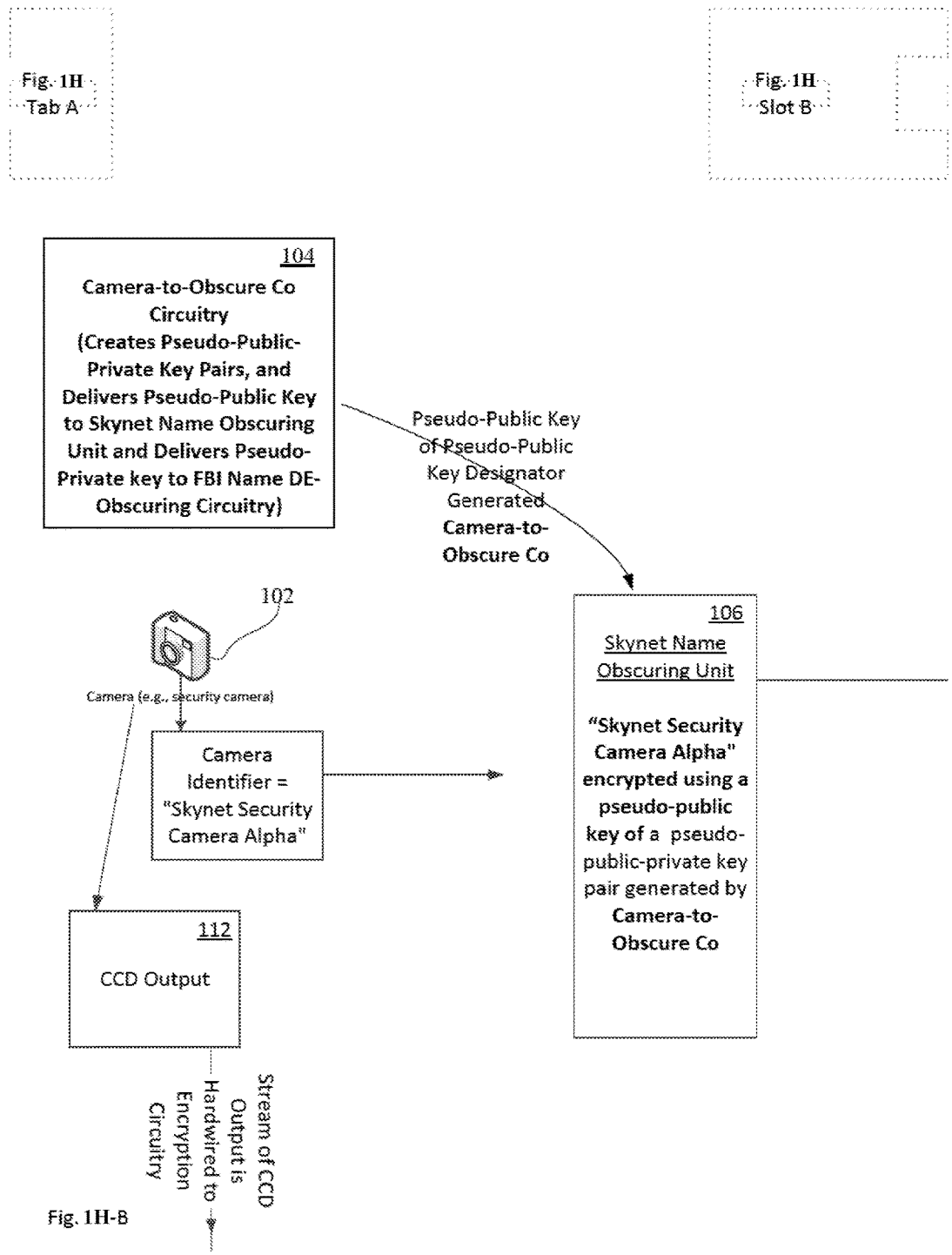

Fig. 1H
Tab B

→ "Encrypted-Camera-ID" (String that is Result of Encrypting "Skynet Security Camera Alpha") ; 16 June 2014; Time 10:00 a.m. – 11:00 a.m.

Fig.1H-C

Fig. 1H
Slot D

Fig.1H
Tab C

Skynet Level 1 Encryption Circuitry          110

Fig.1H
Slot E

Level-One Encrypted

A116
Encrypted Partial Video/Audio Frame (e.g., with Cyberdine-Protective-Services Pseudo-Public Encryption Key)

A110
Unique Cyberdine-Protective-Services Key Pair Designator

Fig.1H
Slot F

Fig.1H-D

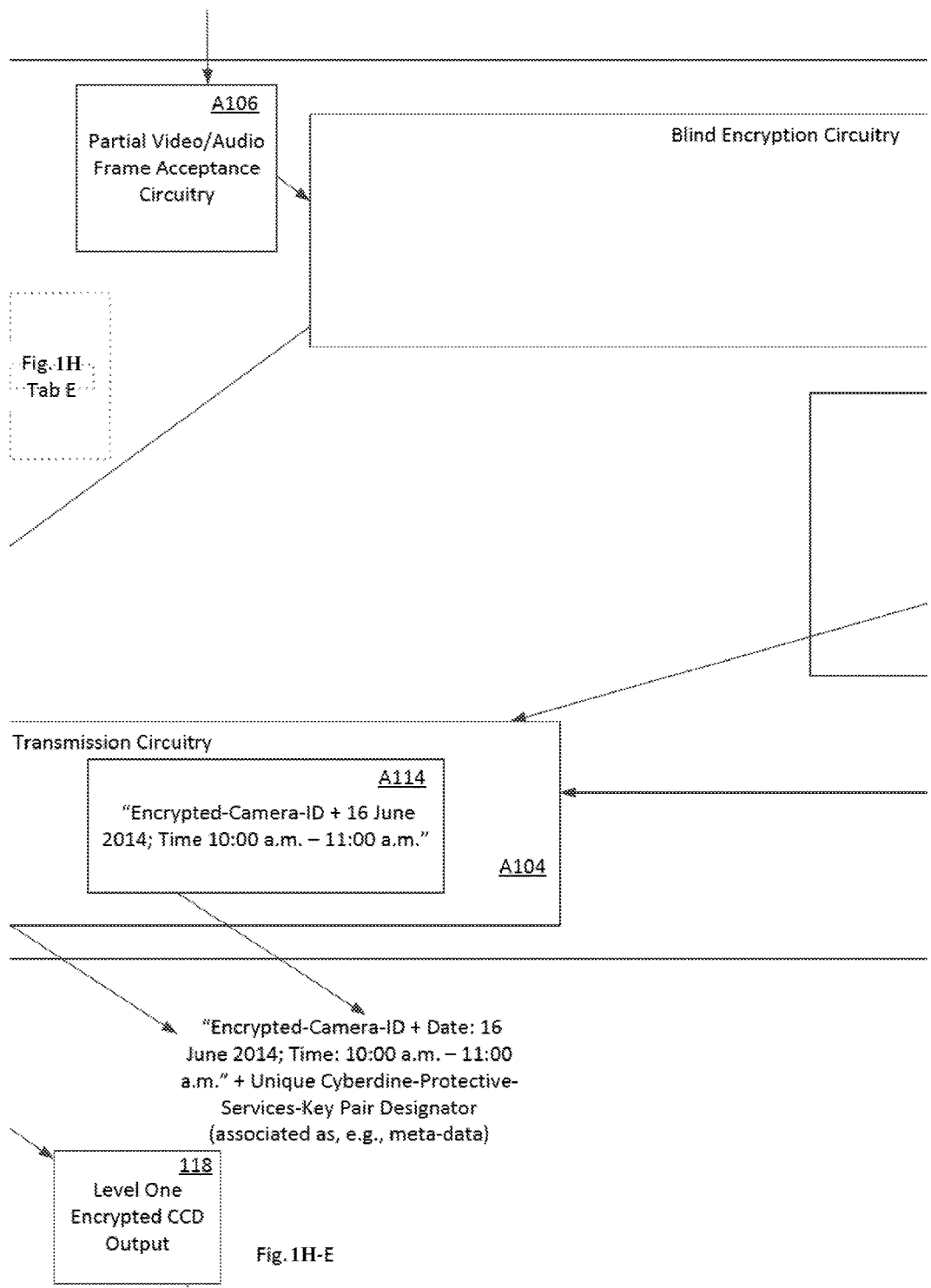

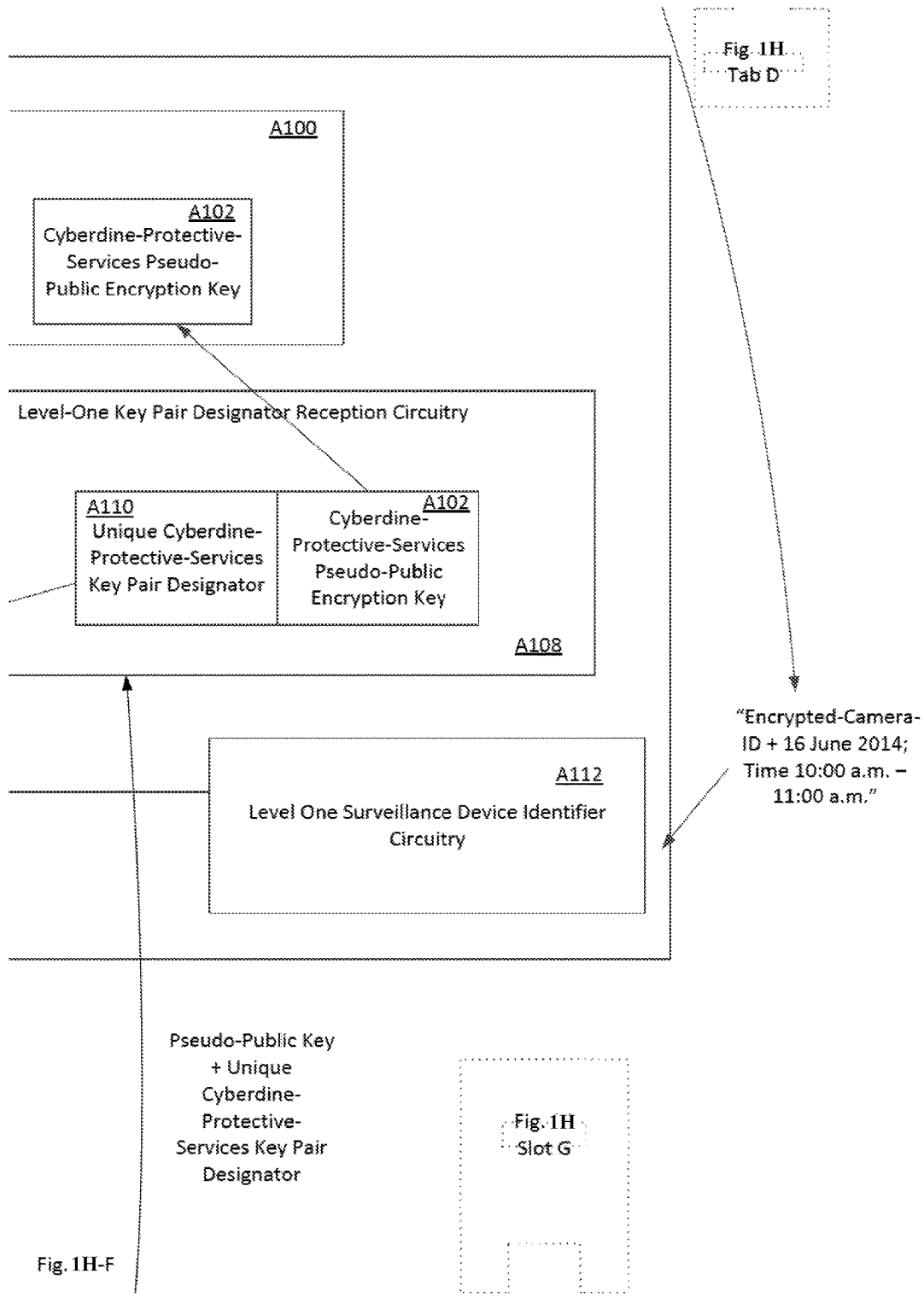

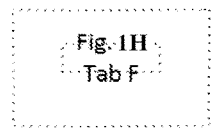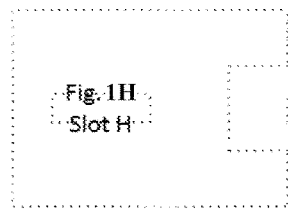
Fig. 1H-G

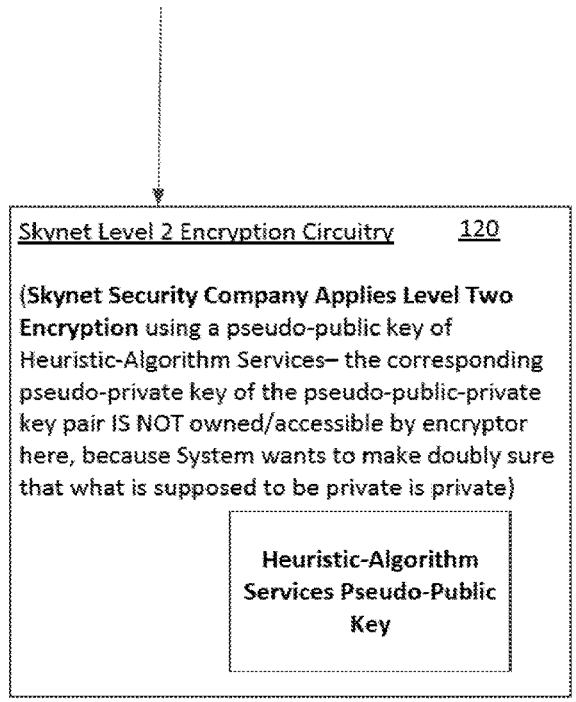
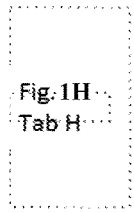
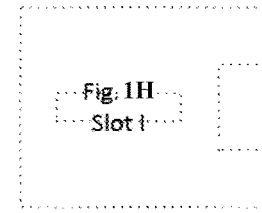
Fig. 1H-H

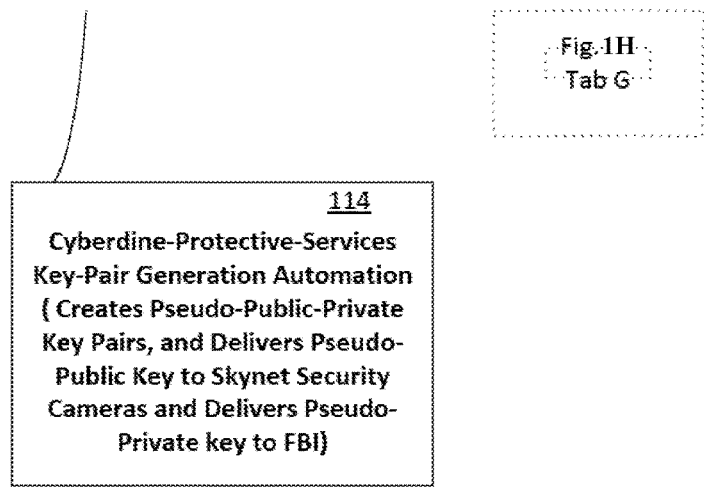
Fig. 1H-I

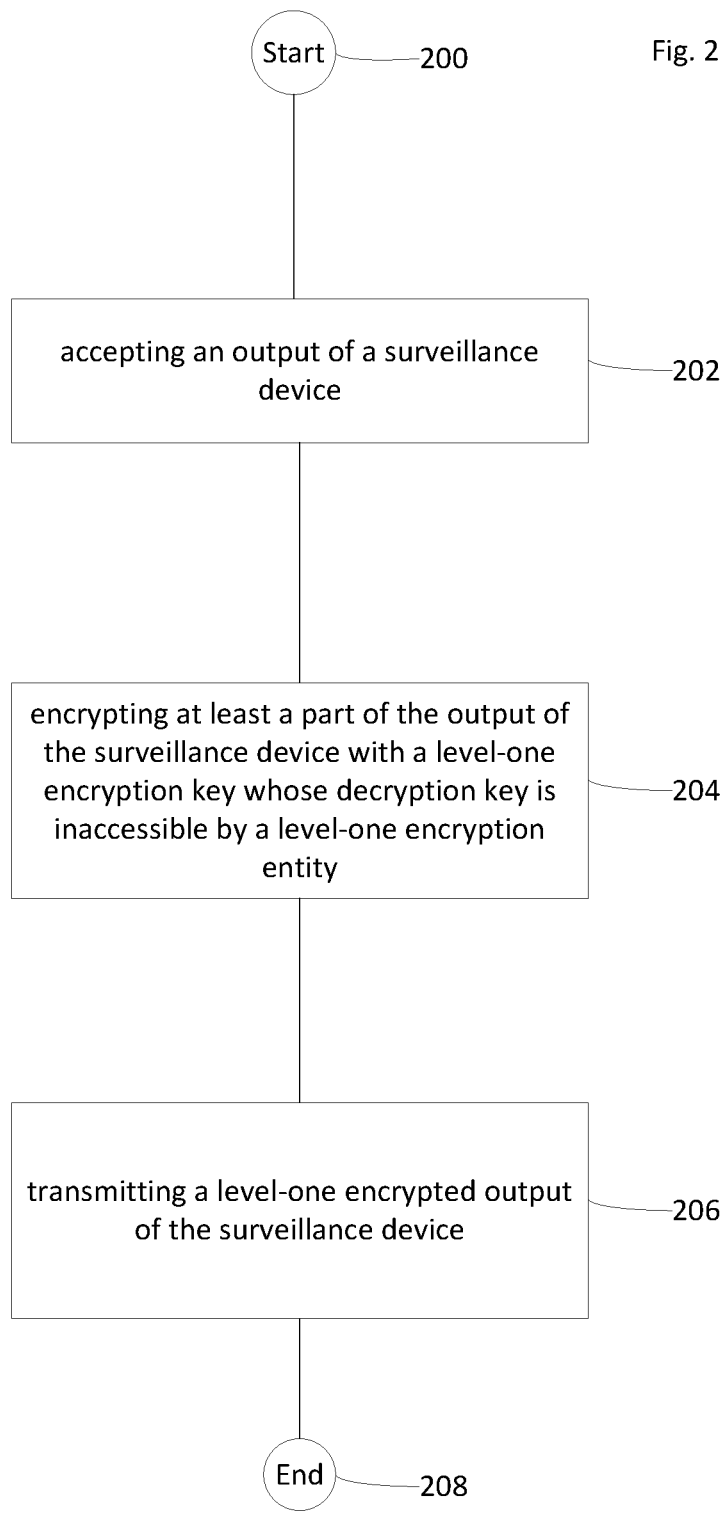

LEVEL-ONE ENCRYPTION ASSOCIATED WITH INDIVIDUAL PRIVACY AND PUBLIC SAFETY PROTECTION VIA DOUBLE ENCRYPTED LOCK BOX

If an application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority application(s)). In addition, the present application is related to the "Related applications," if any, listed below.

PRIORITY APPLICATIONS

For purposes of the USPTO extra-statutory requirements, the present application constitutes a continuation-in-part of U.S. patent application Ser. No. 13/653,222, entitled LEVEL-ONE ENCRYPTION ASSOCIATED WITH INDIVIDUAL PRIVACY AND PUBLIC SAFETY PROTECTION VIA DOUBLE ENCRYPTED LOCK BOX, naming EDWARD K. Y. JUNG; ROYCE A. LEVIEN; RICHARD T. LORD; ROBERT W. LORD; AND MARK A. MALAMUD as inventors, filed 16, Oct., 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/385,598, entitled RIGHT OF INDIVIDUAL PRIVACY AND PUBLIC SAFETY PROTECTION VIA DOUBLE ENCRYPTED LOCK BOX, naming EDWARD K. Y. JUNG; ROYCE A. LEVIEN; RICHARD T. LORD; ROBERT W. LORD; AND MARK A. MALAMUD as inventors, filed 12 Jul., 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/385,598 entitled RIGHT OF INDIVIDUAL PRIVACY AND PUBLIC SAFETY PROTECTION VIA DOUBLE ENCRYPTED LOCK BOX, naming Edward K. Y. Jung, Royce A. Levien, Richard T. Lord, Robert W. Lord, and Mark Malamud, as inventors filed 12 Jul. 2012, which is currently co-pending or is an application of which a currently co-pending application is entitled to the benefit of the filing date.

RELATED APPLICATIONS

NONE

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed application, USPTO Official Gazette Mar. 18, 2003. The USPTO further has provided forms for the application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority applications section of the ADS and to each application that appears in the Priority applications section of this application.

All subject matter of the Priority applications and the Related applications and of any and all parent, grandparent, great-grandparent, etc. applications of the Priority applications and the Related applications, including any priority claims, is incorporated herein by reference to the extent such subject matter is not inconsistent herewith.

SUMMARY

In one or more various aspects, a method includes but is not limited to accepting an output of a surveillance device; encrypting at least a part of the output of the surveillance device with a level-one encryption key whose decryption key is inaccessible by a level-one encryption entity; and transmitting a level-one encrypted output of the surveillance device. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, computer programming, and/or firmware configured to effect the herein-referenced method aspects depending upon the design choices of the system designer, and limited to patentable subject matter under 35 USC 101.

In one aspect, a system includes but is not limited to a machine configured to create a physical reality of accepting an output of a surveillance device; a machine configured to create a physical reality of encrypting at least a part of the output of the surveillance device with a level-one encryption key whose decryption key is inaccessible by a level-one encryption entity; and a machine configured to create a physical reality of transmitting a level-one encrypted output of the surveillance device. In addition to the foregoing, other system aspects are described in the claims, drawings, and text forming a part of the disclosure set forth herein.

In addition to the foregoing, various other method and/or system and/or program product aspects are set forth and described in the text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the disclosures set forth herein.

BRIEF DESCRIPTION OF THE FIGURES

FIGS. 1A through 1H and FIGS. 1H-A through 1H-I show a partially schematic diagram of an environment(s) and/or an implementation(s) of technologies described herein.

FIG. 1Y depicts a partially schematic diagram of an environment(s) and/or an implementation(s) of technologies described herein.

FIGS. 2-9 illustrate system/operation descriptions of implementations.

The use of the same symbols in different drawings typically indicates similar or identical items unless context dictates otherwise.

DETAILED DESCRIPTION

Figure 1A:
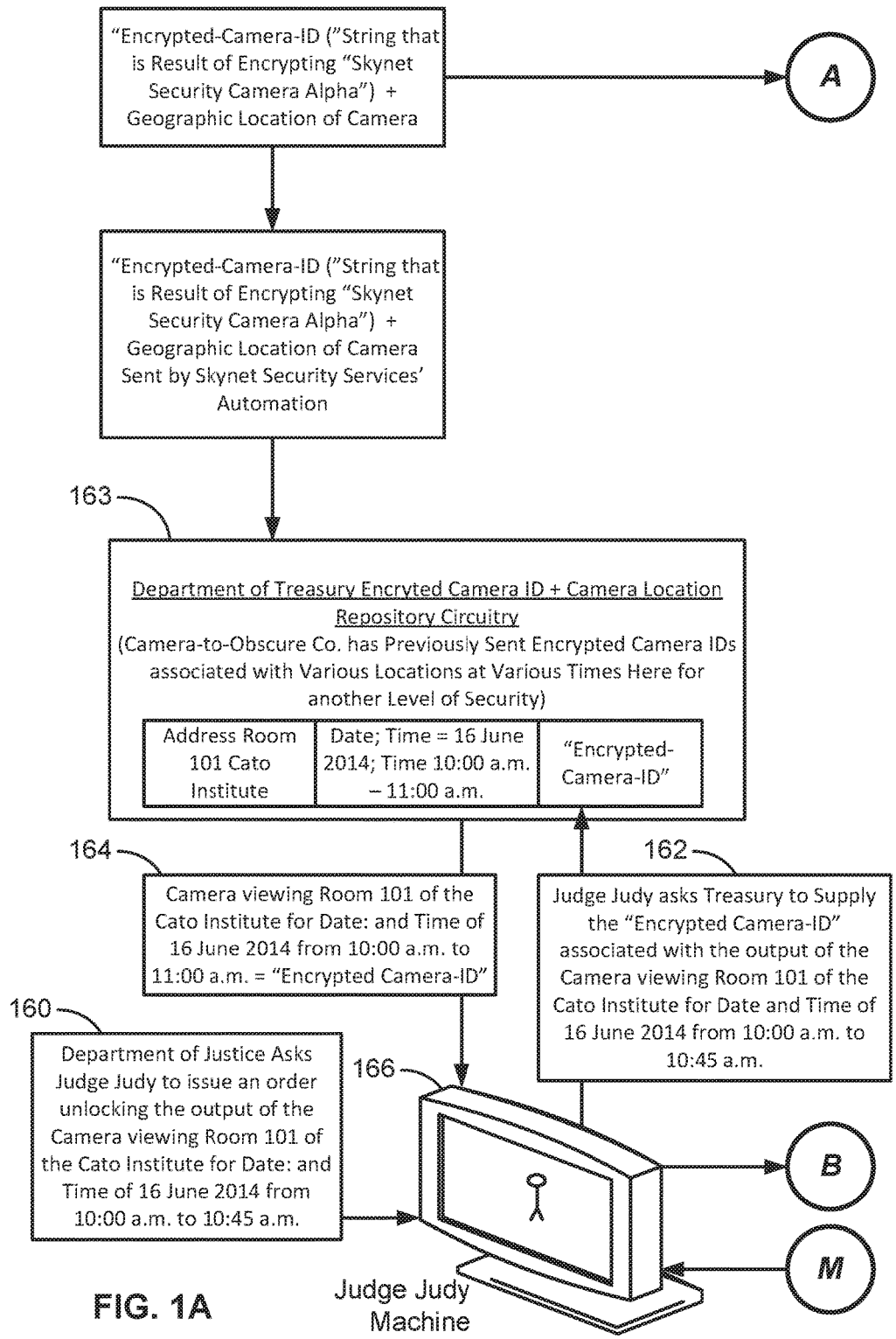
Figure 1B:
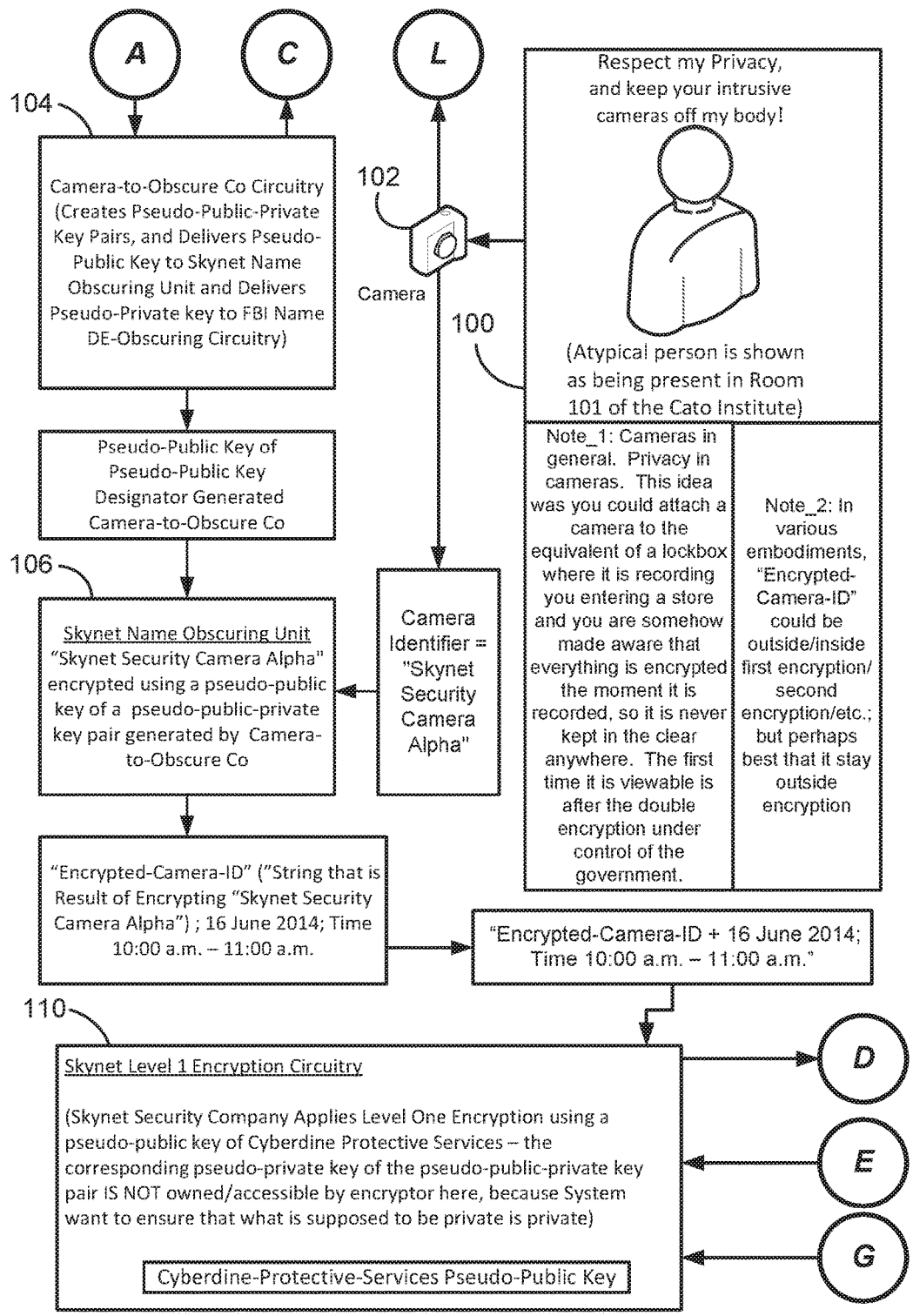
Figure 1C:
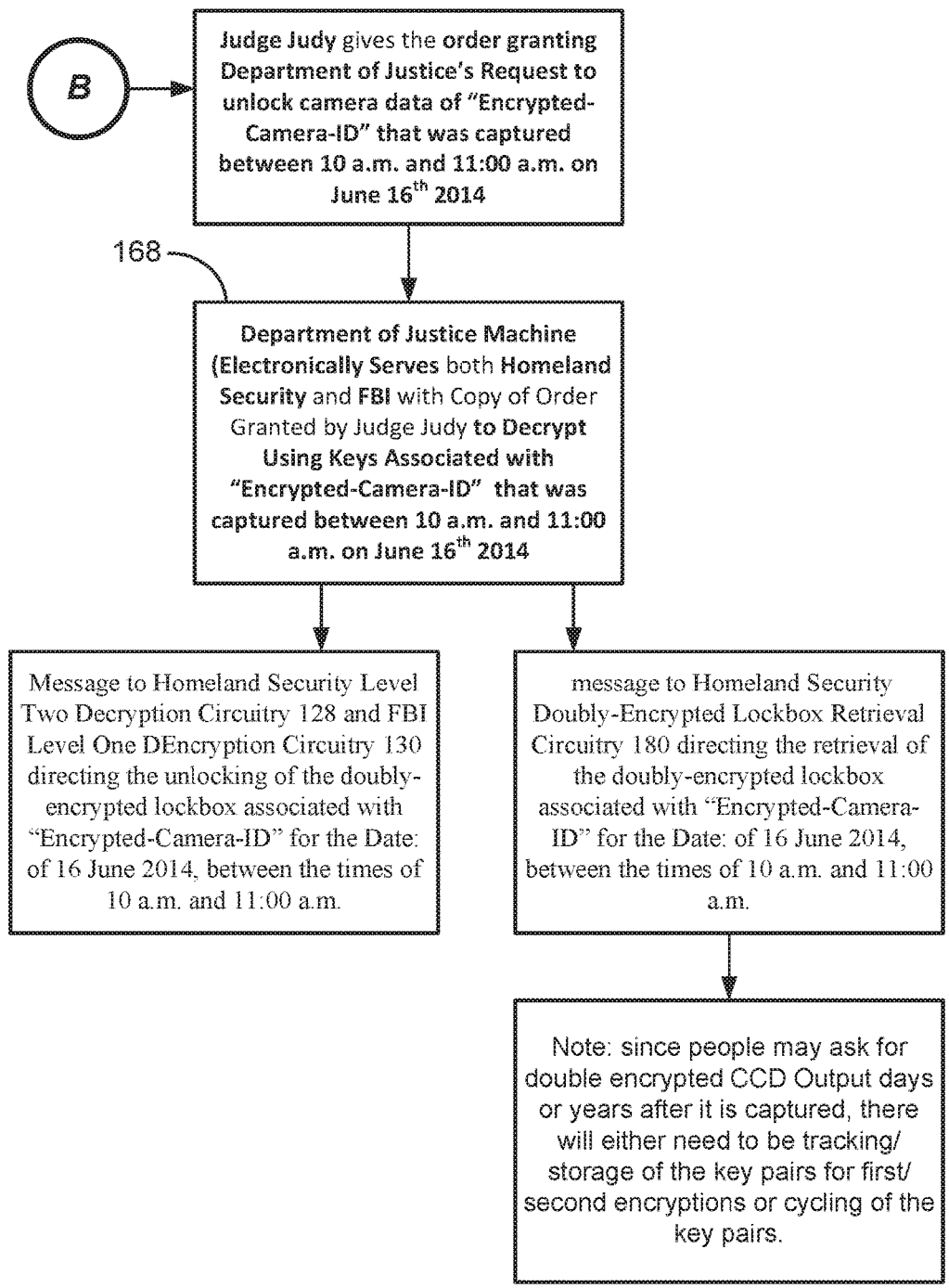
Figure 1D:
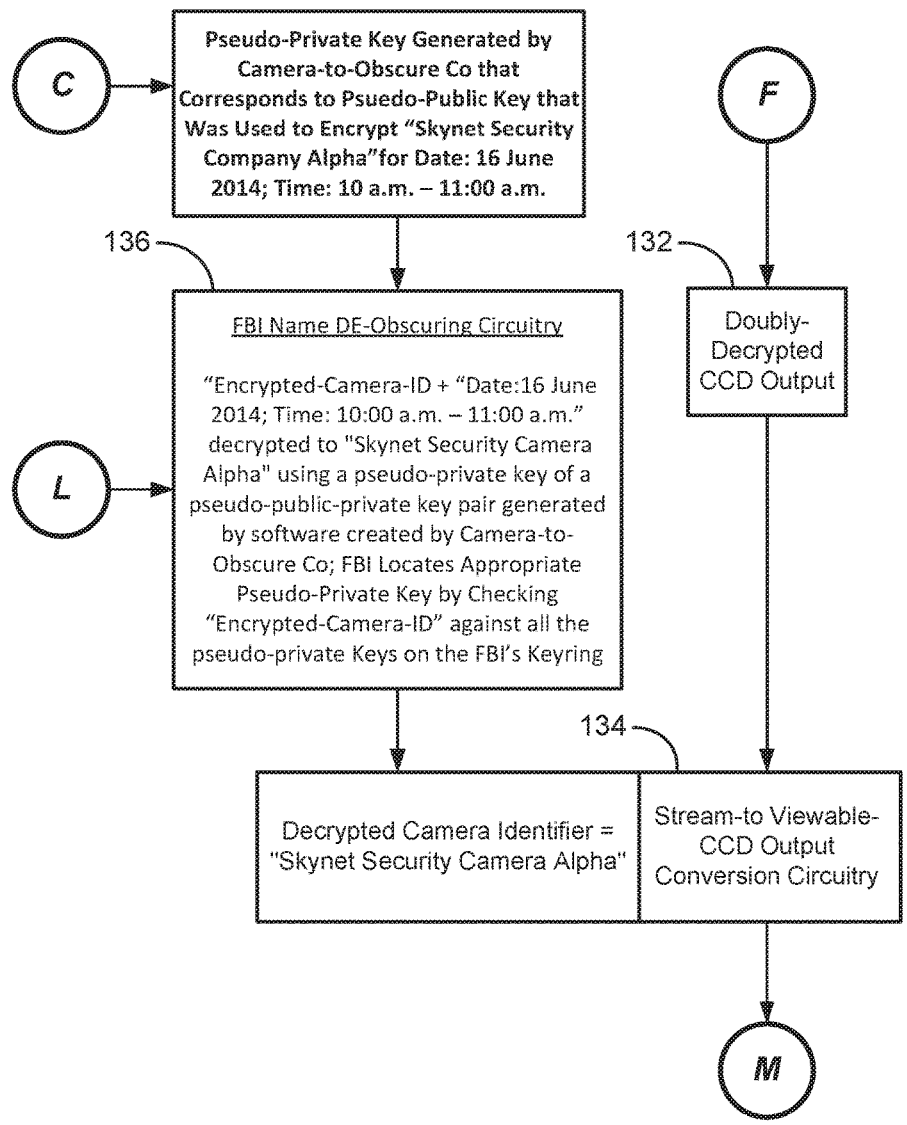
Figure 1E:
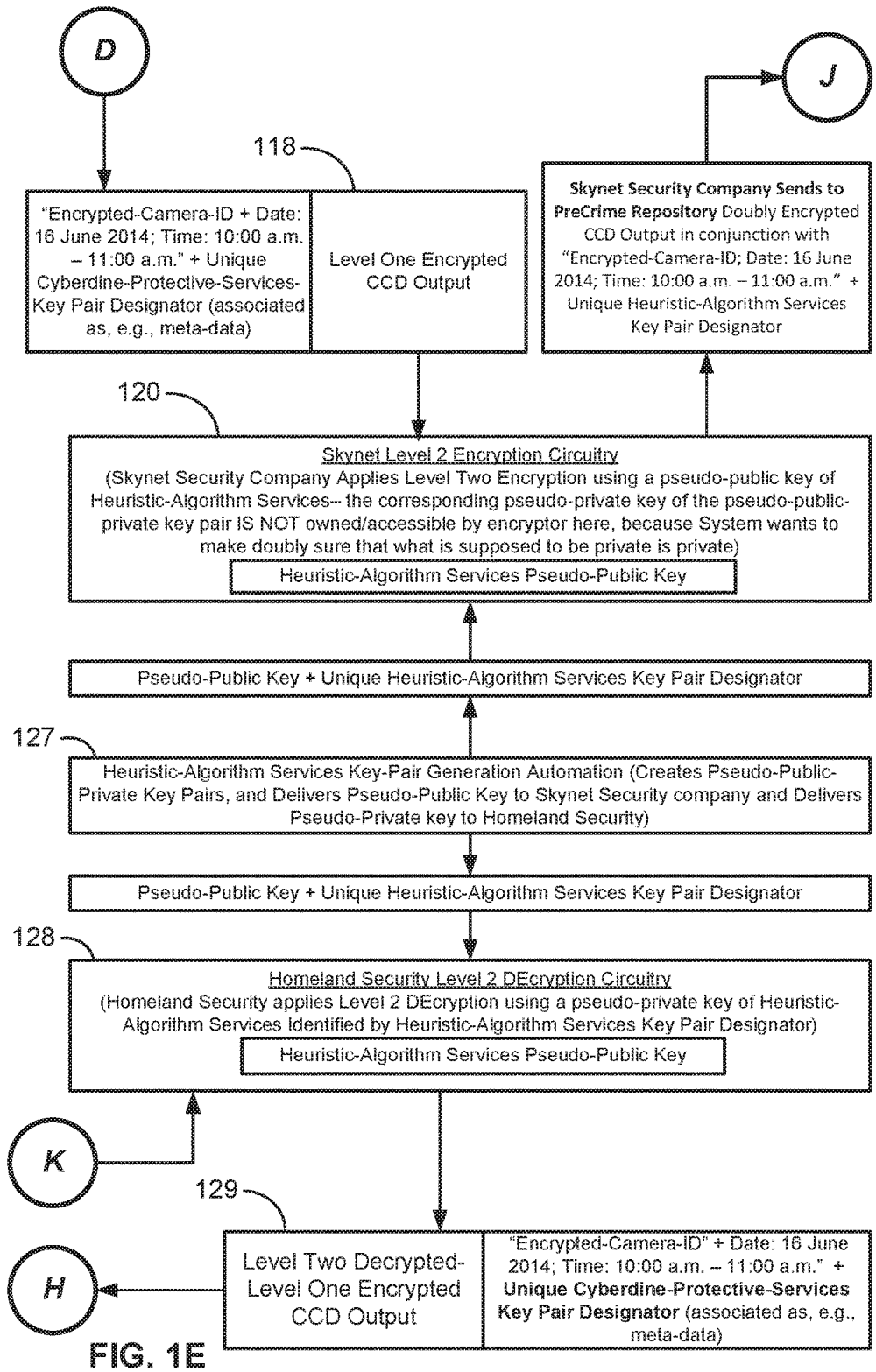
Figure 1F:
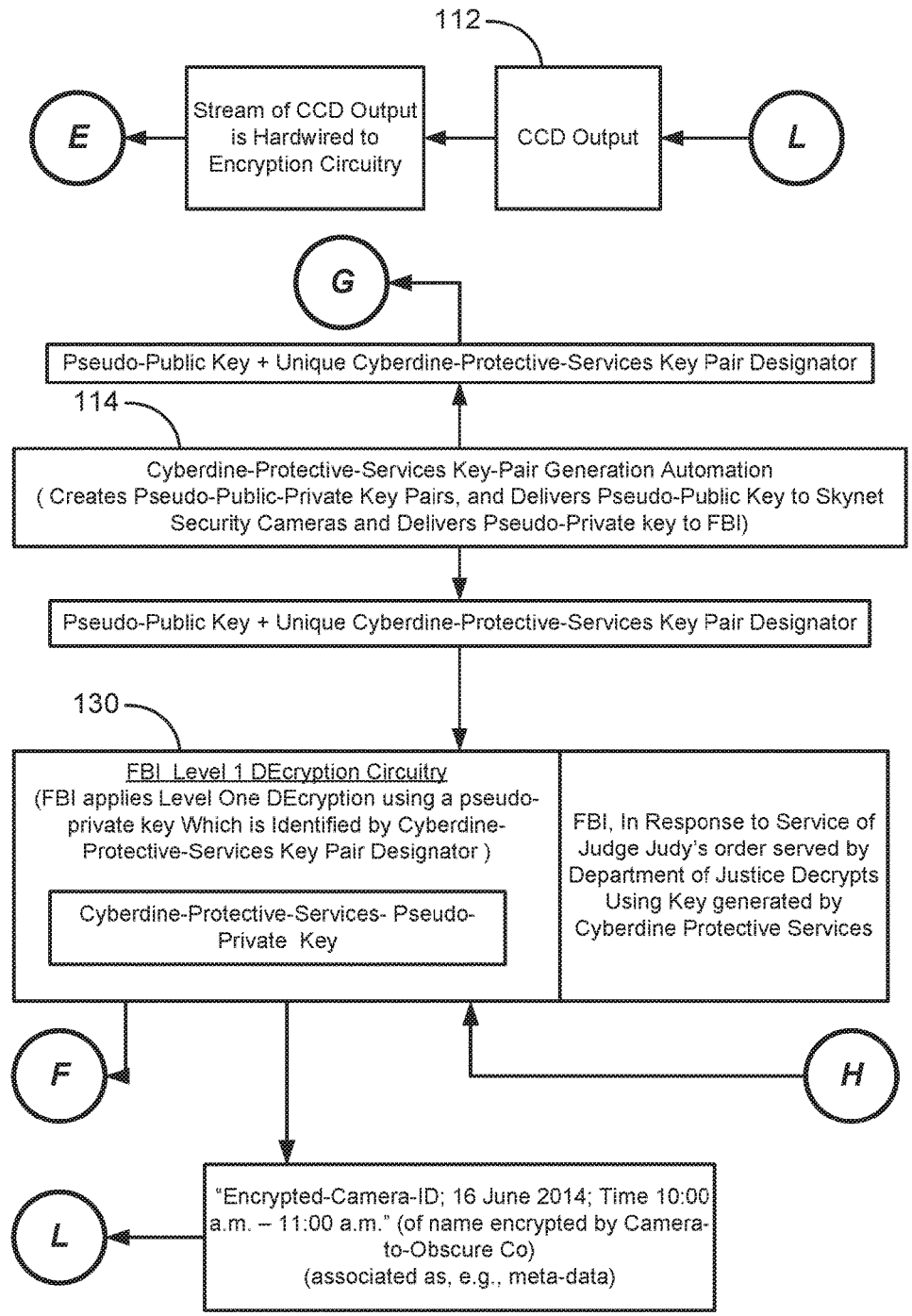
Figure 1G:
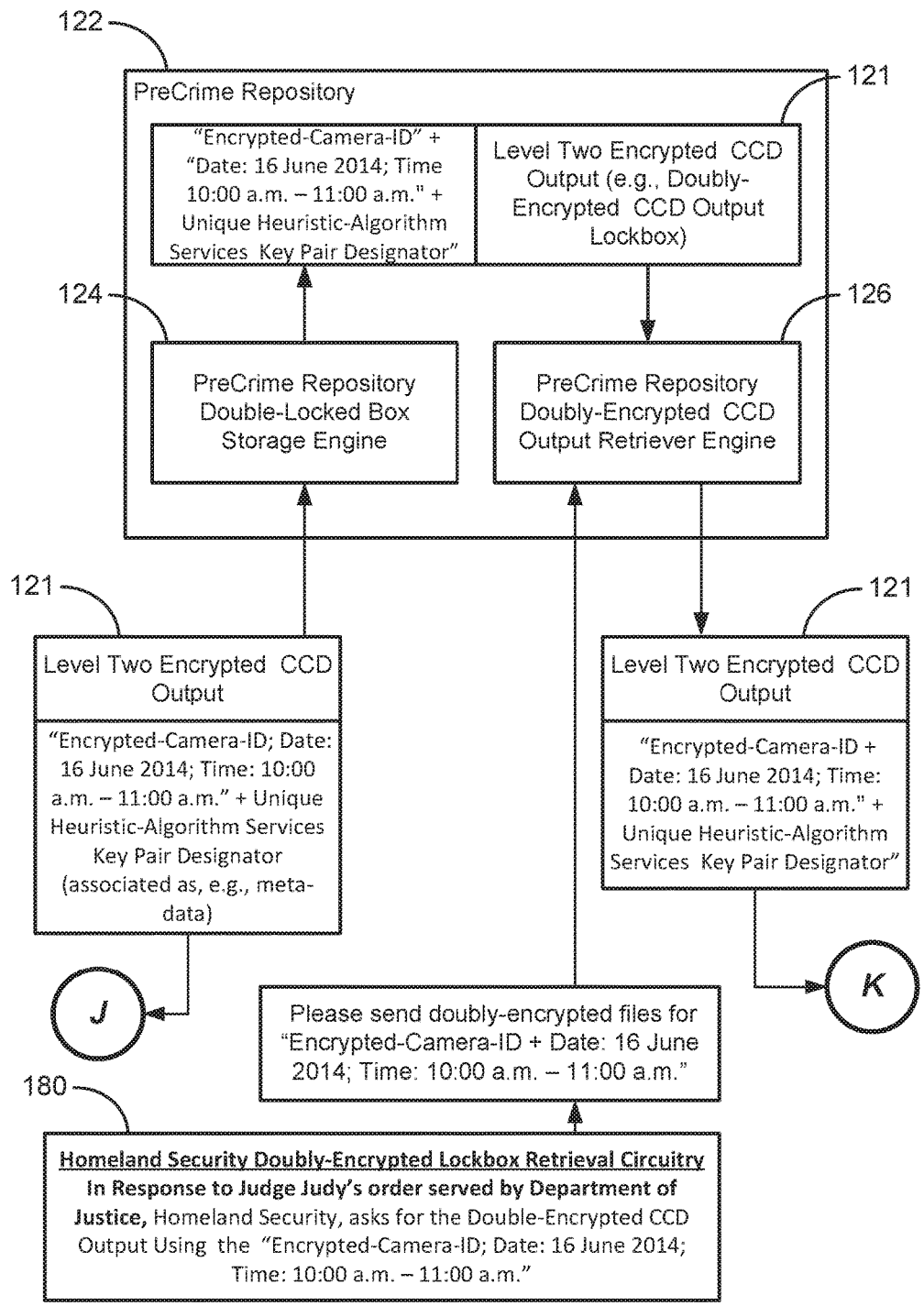

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 3:
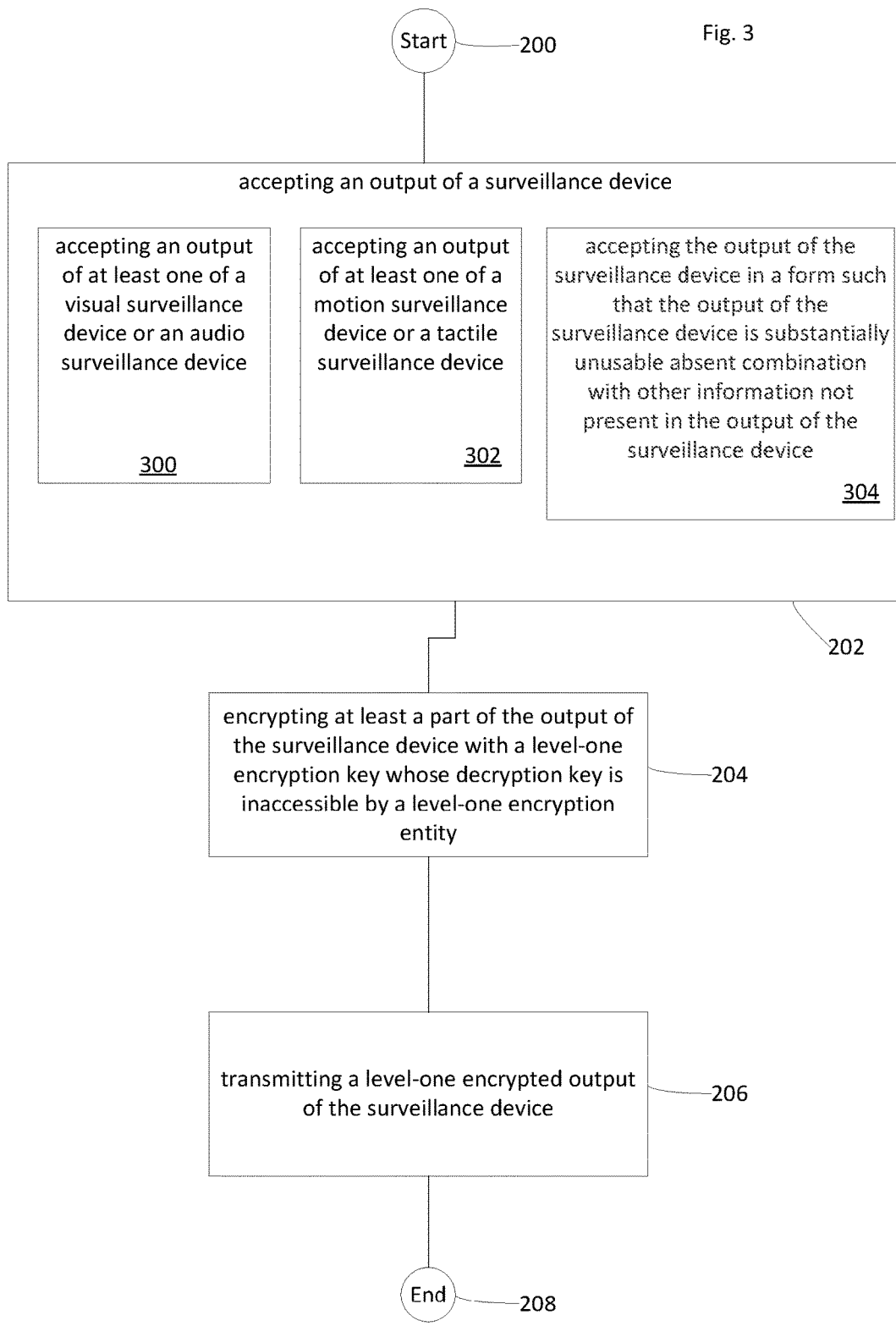

As a courtesy to the reader, and with reference now to the accompanying figures herein, in general "100 series" reference numerals will typically refer to items first introduced/described by FIGS. 1A-H and FIGS. 1H-A through 1H-I, "200 series" reference numerals will typically refer to items first introduced/described by FIG. 2, "300 series" reference numerals will typically refer to items first introduced/described by FIG. 3, etc.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

I. Overview: Operational/Functional Language Herein Describes Machines/Machine Control/Machine-Controlled Processes Unless Context Dictates Otherwise The claims, description, and drawings of this application may describe one or more of the instant technologies in operational/functional language, for example as a set of operations to be performed by a computer. Such operational/functional description in most instances would be understood by one skilled in the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very High speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mutt," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/ operational technical descriptions are seen as specifying hardware configurations of almost unimaginable complexity.

As outlined above, the reason for the use of functional/ operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

II. Panoptic System and Method Architectures

With reference now to the Figures and with reference now to FIGS. 1A-1H and FIGS. 1H-A through 1H-I, these figures show a partially schematic diagram of an environment(s) and/or an implementation(s) of technologies described herein. FIGS. 1A-1H and FIGS. 1H-A through 1H-I depict a typical person 100 resident within the confines of Room 101 of the Cato Institute. FIGS. 1A-1H and FIGS. 1H-A through 1H-I illustrate that Room 101 of the Cato Institute is surveilled by camera 102, where camera 102 has an associated identifier (e.g., name) of "Skynet Security Camera Alpha."

FIGS. 1A-1H and FIGS. 1H-A through 1H-I illustrate that Camera-to-Obscure Co. Circuitry 104 creates a pseudo-public-private key pair. FIGS. 1A-1H and FIGS. 1H-A through 1H-I show that Camera-to-Obscure Co. Circuitry 104 transmits Camera-to-Obscure Co. generated Pseudo-Public Key to Skynet Name Obscuring Unit 106. FIGS. 1A-1H and FIGS. 1H-A through 1H-I depict that the output of Skynet Name Obscuring Unit 106 is "Encrypted-Camera-ID" which is a string that results from encrypting "Skynet Security Camera Alpha" with the pseudo-public key delivered to Skynet Name Obscuring Unit 106 by Camera-to-Obscure Co. Circuitry 104. FIGS. 1A-1H and FIGS. 1H-A through 1H-I further depict that Camera-to-Obscure Co. Circuitry 104 transmits Camera-to-Obscure Co. generated Pseudo-Private Key to FBI Name DE-Obscuring Circuitry 136, which as show herein, in one implementation, will subsequently attempt to unlock various received encrypted names by trying to decrypt the received encrypted names via trying various pseudo-private keys on the FBI Name DE-Obscuring Circuitry 136's private key chain until the encrypted name is unlocked; that is, in a fashion analogous to a human trying similar looking keys on his key chain to find the key that opens the front door to his house. In other implementations FBI Name DE-Obscuring Circuitry 136 uses a Unique Camera-to-Obscure Co. Key pair designator (not shown), analogous to the ways unique key pair designators are used as described elsewhere herein with respect to, for example, the pseudo-public-private key pairs respectively generated by Cyberdine Protective Services and Heuristic Algorithm Services such as described herein; such alternate implementations for the FBI Name DE-Obscuring Circuitry 136 that use a Unique Camera-to-Obscure Co. Key pair designator are not shown in the drawings for sake of clarity but can be understood in light of at least the referenced examples herein.

FIGS. 1A-1H and FIGS. 1H-A through 1H-I illustrate that Skynet Name Obscuring Unit 106 transmits output—"Encrypted-Camera-ID"—which is the string that is the result of encrypting "Skynet Security Camera Alpha" with the pseudo-public key of the pseudo-public-private key pair generated by Camera-to-Obscure Co. circuitry 104—plus a date and time window for which "Encrypted-Camera ID" is good (e.g., 16 Jun. 2014 from 10:00 a.m. to 11:00 a.m.) to Skynet Level One Encryption Circuitry 110. In some implementations, the date and time is optional, and Skynet Level One Encryption Circuitry 110 just appends the appropriate date and time during which CCD output 112 is received from camera 102.

FIGS. 1A-1H and FIGS. 1H-A through 1H-I show that in one implementation CCD output 112 from camera 102 feeds—via a hardwired connection—directly into Skynet Level One Encryption Circuitry 110 as a stream—not a frame. Thus, in one implementation such as illustrated herein, at no point can camera 102's output be intelligibly accessed until/unless several different legal entities—controlling very different encryption/decryption automation the keys to which encryption/decryption are at no time held by a single party who can decrypt and see the camera output—work in a transparent and coordinated fashion.

FIGS. 1A-1H and FIGS. 1H-A through 1H-I show atypical person 100 (e.g., one with an alternative lifestyle) who just wants to be left alone but is aware that camera 102—"Skynet Security Camera Alpha"—is surveilling Room 101 of the Cato Institute where atypical person 100 is resident. Accordingly, atypical person 100 is depicted as saying "respect my privacy, and keep your intrusive cameras off my body!"

In one implementation, the public safety is served by constant camera surveillance of Room 101 of the Cato Institute, but atypical person 100 has legitimate concerns as to how such surveillance data might be used. To allay atypical person 100's concerns, illustrated is that CCD output 112 of camera 102 is clocked directly into Skynet Level One Encryption Circuitry 110 as a stream (e.g., such that it can't typically be viewed as video data), which in one implementation immediately encrypts the stream of CCD output 112 using a pseudo-public key generated by Cyberdine-Protective-Services Key-Pair Generation Automation 114.

Continuing to refer to FIGS. 1A-1H and FIGS. 1H-A through 1H-I, illustrated is that Cyberdine-Protective-Services Key-Pair Generation Automation 114 creates pseudo-public-private key pairs. Shown is that Cyberdine-Protective-Services Key-Pair Generation Automation 114 delivers the pseudo-public key along with a Unique Cyberdine-Protective-Services Key Pair Designator to Skynet Level One Encryption Circuitry 110 (as show herein Unique Cyberdine-Protective-Services Key Pair Designator will ultimately be utilized to coordinate the pseudo-public and pseudo-private keys by two different and unique legal entities; that is, the unique designator will allow different entities, which are "blind" to the pairing of the pseudo-public and pseudo-private keys, to subsequently use the correct pseudo-private key to decrypt that which was encoded with the corresponding pseudo-public key). Skynet Level One Encryption Circuitry 110 is depicted as under the legal control and administration of Skynet Security Company.

FIGS. 1A-1H and FIGS. 1H-A through 1H-I show that Cyberdine-Protective-Services Key-Pair Generation Automation 114 delivers the pseudo-private key along with a unique Cyberdine-Protective-Services Key Pair Designator which serves to identify the pseudo-public-private key pair of which the pseudo-private key forms a part to Federal Bureau of Investigation ("FBI") Level One DEcryption Circuitry 130.

FIGS. 1A-1H and FIGS. 1H-A through 1H-I illustrate that while Cyberdine Protective Services has legal control and administration of both keys of the pair, as well as the Cyberdine-Generated Unique Key Pair Designator which serves to identify/coordinate the key pair, Cyberdine Protective Services does not have access to CCD output 112 of camera 102. FIGS. 1A-1H and FIGS. 1H-A through 1H-I show that when Skynet Level One Encryption Circuitry 110 encrypts CCD output 112 of camera 102 with the Cyberdine-Security-Services generated pseudo-public key, Skynet has no legal control, administration, or possession of the corresponding Cyberdine-Security-Services generated pseudo-private key which could be used to unlock the encryption of CCD output 112 of camera 102 that was/is instantiated by Skynet Level One Encryption Circuitry 110. Cyberdine-Protective-Services Key-Pair Generation Automation 114 is depicted as under the legal control and administration of Cyberdine Protective Services Company which is separate and apart from Skynet Security Company.

FIGS. 1A-1H and FIGS. 1H-A through 1H-I illustrate that the system ensures that Skynet Security Company cannot see any image because it only holds the pseudo-public key of a pseudo-public-private key pair that has been generated by another legal entity, Cyberdine Protective Services Company.

FIGS. 1A-1H and FIGS. 1H-A through 1H-I show that, in one implementation, Skynet Level One Encryption Circuitry 110, after receipt of "Encrypted-Camera-ID" which is the string that is result of encrypting "Skynet Security Camera Alpha" plus a date and time window for which "Encrypted-Camera ID" is good (e.g., 16 Jun. 2014 from 10:00 a.m. to 11:00 a.m.) from Skynet Name Obscuring Unit 106, encrypts CCD output 112 of camera 102 that occurred on 16 Jun. 2014 from 10:00 a.m. to 11:00 a.m. via the pseudo-public key of the pseudo-public-private key pair generated by Cyberdine Protective Services Company. Thereafter, illustrated is that Skynet Level One Encryption Circuitry 110 associates the Level One encryption of CCD output 112 of camera 102 with meta-data composed of "'Encrypted-Camera-ID"+"Date: 16 Jun. 2014; Time: 10:00 a.m.-11:00 a.m."+"Unique Cyberdine-Protective-Services Key Pair Designator.'" In the instance shown, the "'Encrypted-Camera-ID"+"Date: 16 Jun. 2014; Time: 10:00 a.m.-11:00 a.m."+"Unique Cyberdine-Protective-Services Key Pair Designator'" meta-data is kept outside the Level One encryption applied by Skynet Level One Encryption Circuitry 110, but those skilled in the art will appreciate that in other implementations all or part of such meta-data may be emplaced inside the Level One encryption.

FIGS. 1A-1H and FIGS. 1H-A through 1H-I show that, subsequently, Skynet Level One Encryption Circuitry 110 sends Level One encrypted CCD output 118, and its associated meta-data of "'Encrypted-Camera-ID"+"Date: 16 Jun. 2014; Time: 10:00 a.m.-11:00 a.m."+"Unique Cyberdine-Protective-Services Key Pair Designator'" to Skynet Level Two Encryption Circuitry 120. FIG. 1 depicts that upon receipt of Level One Encrypted CCD output 118, Skynet Level Two Encryption Circuitry 120 encrypts the received Level One Encrypted CCD output 118 as well as its associated meta-data of "'Encrypted-Camera-ID"+"Date: 16 Jun. 2014; Time: 10:00 a.m.-11:00 a.m."+"Unique Cyberdine-Protective-Services Key Pair Designator'" using a pseudo-public key of a pseudo-public-private key pair that has been generated by another legal entity, Heuristic-Algorithm Services, thus creating a Level Two encryption of Level One Encrypted CCD output 118. With reference now back to CCD output 112 of camera 102 at this point FIG. 1 shows that the Level Two encryption of Level One Encrypted CCD output 118 is a doubly-encrypted version of CCD output 112 of camera 102.

FIGS. 1A-1H and FIGS. 1H-A through 1H-I illustrate that the system ensures that Skynet Level Two Encryption Circuitry 120 can only encrypt because it holds only the pseudo-public key of a pseudo-public-private key pair that has been generated by yet another legal entity, Heuristic-Algorithm Services. FIGS. 1A-1H and FIGS. 1H-A through 1H-I show that Heuristic-Algorithm Services also generates a "Unique Heuristic-Algorithm-Services Key Pair Designator" that will subsequently be used to "pair" the correct pseudo-private key with the correct pseudo-public key by separate legal entities that are effectively "blind" to the pairing done by Heuristic-Algorithm Services. As shown herein, the pseudo-public-private key pairs and the Unique Heuristic-Algorithm-Services Key Pair Designator are generated by Heuristic-Algorithm-Services Key Pair Generation Automation 127, which is under the legal control and administration of Heuristic-Algorithm Services Company.

Illustrated is that Skynet Security Level Two Encryption Circuitry 120 thereafter associates the meta-data of "'Encrypted-Camera-ID"+"Date: 16 Jun. 2014; Time: 10:00 a.m.-11:00 a.m."+"Unique Heuristic-Algorithm-Services Key Pair Designator'" with the Level Two Encrypted CCD output 121.

Thereafter, illustrated is that Skynet Security Level Two Encryption Circuitry 120 sends the Level Two encrypted CCD output 121, having associated meta-data of "'Encrypted-Camera-ID"+"Date: 16 Jun. 2014; Time: 10:00 a.m.-11:00 a.m."+"Unique Heuristic-Algorithm-Services Key Pair Designator'" to PreCrime Repository 122. The neologism "PreCrime" is used herein for sake of illustration, and may be understood as representative of a "pre-event-of-interest" concept.

Shown is that PreCrime Repository Double-Locked Box Storage Engine 124 receives the Level Two Encrypted CCD Output 121, having associated meta-data of "'Encrypted-Camera-ID"+"Date: 16 Jun. 2014; Time: 10:00 a.m.-11:00 a.m."+"Unique Heuristic-Algorithm-Services Key Pair Designator'" which is then stored as a doubly-encrypted CCD output lockbox indexed by some or all of its meta-data (e.g., indexed by some or all of "'Encrypted-Camera-ID"+"Date: 16 Jun. 2014; Time: 10:00 a.m.-11:00 a.m."+"Unique Heuristic-Algorithm-Services Key Pair Designator'"). In alternate implementations Level Two Encrypted CCD Output 121 is indexed by "Encrypted-Camera-ID" alone, while in other alternate implementations the Level Two encrypted data is indexed by "Unique Heuristic-Algorithm-Services Key Pair Designator" alone, but FIGS. 1A-1H and FIGS. 1H-A through 1H-I show meta-data of "'Encrypted-Camera-ID"+"Date: 16 Jun. 2014; Time: 10:00 a.m.-11:00 a.m."+"Unique Heuristic-Algorithm-Services Key Pair Designator'" being used to index for sake of clarity.

It is expected that, in a free society in most instances the doubly-encrypted version of CCD output 112 of camera 102 (e.g., Level Two Encrypted CCD Output 121) will never be retrieved and decrypted. That said, it is expected that in some instances public safety might demand that the doubly-encrypted version of CCD output 112 of camera 102 be retrieved and decrypted. For sake of illustration, such an example will now be discussed.

FIGS. 1A-1H and FIGS. 1H-A through 1H-I depict, for sake of example, Judge Judy acting subsequent to the event of a crime (e.g., a terrorist attack) committed in the vicinity of Room 101 of the Cato Institute at some time between 10:00 a.m. and 10:45 a.m. on 16 Jun. 2014. FIGS. 1A-1H and FIGS. 1H-A through 1H-I illustrate the Department of Justice asking 160 Judge Judy to issue an order for the unlocking of the camera output from 10:00 a.m. and 10:45 a.m. on 16 Jun. 2014 that is associated with a view of Room 101 of the Cato Institute at the time in question. At this point, neither the Department of Justice nor Judge Judy has a name identifying the camera in question. In response, FIGS. 1A-1H and FIGS. 1H-A through 1H-I show Judge Judy's machine 166 asking 162 the Department of Treasury Encrypted Camera ID+Camera Location Repository Circuitry 163 (Camera-to-Obscure Co and/or Skynet Security Company is shown as having delivered such information to Treasury at or around the time of such output's creation) for the "Encrypted-Camera-ID" that is associated with the camera that was viewing Room 101 of the Cato Institute on the date of 16 Jun. 2014, between the times of 10:00 a.m. and 10:45 a.m.

In response, FIGS. 1A-1H and FIGS. 1H-A through 1H-I show the Department of Treasury Encrypted Camera ID+Camera Location Repository Circuitry 163 transmitting 164 to Judge Judy's machine 166 the "Encrypted-Camera-ID" that is associated with the camera at Room 101 of the Cato Institute for the date of 16 Jun. 2014, between the times of 10:00 a.m. and 10:45 a.m. (e.g. the output of camera 102 from 10:00 a.m. to 11:00 a.m. that the system stored). FIGS. 1A-1H and FIGS. 1H-A through 1H-I depict that Skynet Name Obscuring Unit 106 is shown as having transmitted to Department of Treasury Encrypted Camera ID+Camera Location Repository Circuitry 163 the "Encrypted-Camera-ID" that is associated with the camera having geographic location of Room 101 of the Cato Institute for the date of 16 Jun. 2014, and between the times of 10:00 a.m. and 11:00 a.m. at or around the time "Encrypted Camera ID" was created. That is, at some point prior to Judge Judy's machine 166 making the request.

FIGS. 1A-1H and FIGS. 1H-A through 1H-I depict that, subsequent to receiving "Encrypted-Camera-ID" that is associated with the camera that was surveilling Room 101 of the Cato Institute on the date of 16 Jun. 2014, and between the times of 10:00 a.m. and 11:00 a.m. (the encrypted envelope that holds the time of interest of 10:00 a.m. to 10:45 a.m.), Judge Judy's machine 166 transmits to Department of Justice Machine 168 an order directing that the output of "Encrypted-Camera-ID" associated with the camera at Room 101 of the Cato Institute for the date of 16 Jun. 2014, between the times of 10:00 a.m. and 11:00 a.m. be unlocked. FIGS. 1A-1H and FIGS. 1H-A through 1H-I illustrate that Department of Justice Machine 168 transmits messages to Homeland Security Doubly-Encrypted Lockbox Retrieval Circuitry 180, Homeland Security Level Two DEcryption Circuitry 128, and FBI Level One DEcryption Circuitry 130 directing the retrieval and/or unlocking of the doubly-encrypted lockbox associated with "Encrypted-Camera-ID" for the date of 16 Jun. 2014, between the times of 10:00 a.m. and 11:00 a.m.

FIGS. 1A-1H and FIGS. 1H-A through 1H-I illustrate that, in response to Judge Judy's order the content of which was relayed through the message of Department of Justice Machine 168, Homeland Security Doubly-Encrypted Lockbox Retrieval Circuitry 180 asks PreCrime Repository Circuitry 122 for the files indexed by "'Encrypted-Camera-ID'"; "Date: 16 Jun. 2014; Time: 10:00 a.m.-11:00 a.m.'" More specifically, FIGS. 1A-1H and FIGS. 1H-A through 1H-I show that Homeland Security Doubly-Encrypted Lockbox Retrieval Circuitry 180 transmits a request for the double-encrypted lockbox files having index of "'Encrypted-Camera-ID'"+"Date: 16 Jun. 2014; Time: 10 a.m.-11:00 a.m.'" to PreCrime Repository Doubly-Encrypted CCD Output Retriever Engine 126.

FIGS. 1A-1H and FIGS. 1H-A through 1H-I depict PreCrime Repository Doubly-Encrypted CCD Output Retriever Engine 126 pulling the doubly-encrypted files indexed by "'Encrypted-Camera-ID'"+Date: 16 Jun. 2014; Time: 10:00 a.m.-11:00 a.m.+"Unique Heuristic-Algorithm Services Key Pair Designator'" from within PreCrime Repository 122. FIGS. 1A-1H and FIGS. 1H-A through 1H-I illustrate that thereafter PreCrime Repository Doubly-Encrypted CCD Output Retriever Engine 126 sends Level Two Encrypted CCD output 121 along with the associated meta-data of "'Encrypted-Camera-ID'"+"Date: 16 Jun. 2014; Time: 10:00 a.m.-11:00 a.m."+"Unique Heuristic-Algorithm Services Key Pair Designator'" to Homeland Security Level Two DEcryption Circuitry 128, which, in view of Judge Judy's order, upon receipt decrypts the received Level Two Encrypted CCD output 121 with the correct pseudo-private key generated by Heuristic Algorithm Services. In one implementation, Homeland Security Level Two DEcryption Circuitry 128 is able to retrieve the correct pseudo-private key to do the decryption via use of Unique Heuristic-Algorithm-Services Key Pair Designator which was previously delivered—by Heuristic-Algorithm Services Key-Pair Generation Automation 127—to Homeland Security Level Two DEcryption Circuitry 128 in association with the pseudo-private key that unlocks the corresponding pseudo-public key that was previously used by Skynet Level Two Encryption Circuitry 120 to encrypt as described herein. Thus, in one implementation Unique Heuristic-Algorithm-Services Key Pair Designator is used to retrieve the correct decryption key, even though the decryptor never had possession/control of the Heuristic-Algorithm pseudo-public key that was used to encrypt.

FIGS. 1A-1H and FIGS. 1H-A through 1H-I show that Homeland Security Level Two DEcryption Circuitry 128 uses the pseudo-private encryption key of Heuristic-Algorithm Services that is identified by Unique Heuristic-Algorithm-Services Key Pair Designator—which accompanies the doubly encrypted lockbox as meta-data—to undo the Level Two encryption that was previously instantiated by Skynet Level Two Encryption Circuitry 120. Depicted is that in one implementation the decryption yields the Level-Two Decrypted-Level One Encrypted CCD output data 129 (e.g., the Level Two Decryption applied by Skynet Level Two Encryption Circuitry 120 has been unlocked but the data is still encrypted via the Level One encryption previously applied by Skynet Level One Encryption Circuitry 110) and further depicted is that the decryption done by Homeland Security Level Two Decryption Circuitry 128—accomplished via retrieval of the correct key identified by the Unique Heuristic-Algorithm Services Key Pair Identifier—also provides as output the successful decryption of the Unique Cyberdine-Protective-Services Key Pair Designator (which as shown herein had previously been encrypted by Skynet Level Two Encryption Circuitry 120). FIGS. 1A-1H and FIGS. 1H-A through 1H-I depict that thereafter Homeland Security Level Two DEcryption Circuitry 128 associates as meta-data "'Encrypted-Camera-ID'"+Date: 16 Jun. 2014; Time: 10:00 a.m.-11:00 a.m."+"Unique Cyberdine-Protective-Services Key Pair Designator'" with the Level-Two Decrypted-Level One Encrypted CCD output data 129 (which is still encrypted via the level one encryption previously applied by Skynet Level One Encryption Circuitry 110). FIGS. 1A-1H and FIGS. 1H-A through 1H-I illustrate that Homeland Security Level Two DEcryption Circuitry 128 thereafter sends the meta-data "'Encrypted-Camera-ID'"+"Date: 16 Jun. 2014; Time: 10:00 a.m.-11:00 a.m."+ "Unique Cyberdine-Protective-Services Key Pair Designator'" in association with the with the Level Two Decrypted-Level One Encrypted CCD output data 129 (which is still encrypted via the level one encryption previously applied by Skynet Level One Encryption Circuitry 110) to FBI Level One Decryption Circuitry 130.

FIGS. 1A-1H and FIGS. 1H-A through 1H-I show that, FBI Level One DEcryption Circuitry 130 receives the meta-data "'Encrypted-Camera-ID'"+"Date: 16 Jun. 2014; Time 10:00 a.m.-11:00 a.m."+"Unique Cyberdine-Protective-Services Key Pair Designator'" in association with the Level-Two Decrypted-Level One Encrypted CCD output data 129 (which is still encrypted via the level one encryption previously applied by Skynet Level One Encryption Circuitry 110). FIGS. 1A-1H and FIGS. 1H-A through 1H-I depict that FBI Level One DEcryption Circuitry 130 determines that Judge Judy's order, as related through the message of Department of Justice Machine 168, indicates that the data associated with "Encrypted-Camera-ID" is to be unlocked. Accordingly, FIGS. 1A-1H and FIGS. 1H-A through 1H-I illustrate that FBI Level One DEcryption Circuitry 130 uses the received Unique Cyberdine-Protective-Services Key Pair Designator to retrieve the correct Cyberdine-Protective-Services pseudo-private key that corresponds to the Cyberdine-Protective-Services pseudo-public key that Skynet Level One Encryption Circuitry 110 used to encrypt CCD Output 112. FIGS. 1A-1H and FIGS. 1H-A through 1H-I show that FBI Level One DEcryption Circuitry 130 uses the retrieved Cyberdine-Protective-Services pseudo-private key to unlock the Level One encryption. Thus, FIGS. 1A-1H and FIGS. 1H-A through 1H-I show FBI Level One DEcryption Circuitry 130 outputting doubly-decrypted CCD output 132 (e.g., the in-the-clear stream of CCD output 112 of camera 102).

FIGS. 1A-11H and FIGS. 1H-A through 1H-I depict that Stream-to Viewable-CCD Output Conversion Circuitry 134 converts the stream to viewable CCD output (e.g., still or motion image frames) which is securely displayed in Judge Judy's chambers. Depicted is that for an additional level of citizen's right's protection, "Encrypted-Camera-ID" is sent by FBI Level One DEcryption Circuitry 130 to FBI Name DE-Obscuring Circuitry 136 which then, using a pseudo-private key of a pseudo-public-private key pair generated by software created by Camera-to-Obscure Co., decrypts "Encrypted-Camera-ID" to "Skynet Security Camera Alpha" which is then used by Stream-to Viewable-CCD Output Conversion Circuitry 134 to associate the name of the camera with the viewable CCD output.

FIGS. 1A-1H and FIGS. 1H-A through 1H-I illustrate Judge Judy in her Chambers viewing the output of "Skynet Security Camera Alpha" Video of 10:00 a.m. to 10:45 a.m. that was captured on 16 Jun. 2014. Depicted is that Judge Judy determines that atypical person 100 has done nothing wrong, and concludes that the Department of Justice need not see the output. Thus, FIGS. 1A-1H and FIGS. 1H-A through 1H-I show Judge Judy denying the Department of Justice's request to see the output of the camera viewing Room 101 of the Cato Institute for the date of 16 Jun. 2014 and time from 10:00 a.m. to 10:45 a.m.

Thus as shown herein, atypical citizen 100's rights to privacy, as well as the public's right to safety, are thus protected and/or balanced by the disclosed technologies.

III. Synoptic System and Method Architectures

FIG. 1Y depicts a partially schematic diagram of an environment(s) and/or an implementation(s) of technologies described herein. The components of FIG. 1Y are described in context herein.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

As a courtesy to the reader, and with reference now to the accompanying figures herein, in general "100 series" reference numerals will typically refer to items first introduced/described by FIGS. 1A-1H and FIGS. 1H-A through 1H-I, "200 series" reference numerals will typically refer to items first introduced/described by FIG. 2, "300 series" reference numerals will typically refer to items first introduced/described by FIG. 3, etc.

Referring now to FIG. 2, and FIGS. 1A-1H and FIGS. 1H-A through 1H-I, such figures depict system/operational descriptions of implementations. Operation 200 shows the start of the depiction of the system/operational implementations. Operation 202 illustrates accepting an output of a surveillance device (e.g., accepting (e.g., via Skynet Level One Encryption Circuitry 110) an output of a surveillance device (e.g., output of camera 102)). Operation 204 shows encrypting at least a part of the output of the surveillance device with a level-one encryption key whose decryption key is inaccessible by a level-one encryption entity (e.g., encrypting (e.g., via Level One Blind Encryption Circuit A100 of Skynet Level One Encryption Circuitry 110) at least a part of the output of the surveillance device (e.g., at least a part of output of camera 102) with a level-one encryption key whose decryption key is inaccessible by a level-one encryption entity (e.g., Cyberdine-Protective-Services Pseudo-Public key A102 which could be an encryption key that can be used to encrypt at least a part of output of camera 102 but the unlocking key of which Skynet Level One Encryption Circuitry 110 has no knowledge and for which there is no practicable way by which Skynet Level One Encryption Circuitry 110 can obtain such unlocking key; that is, a key that gives Skynet Level One Encryption Circuitry 110 the ability to encrypt but does not give Skynet Level One Encryption Circuitry 110 the ability to decrypt that which it has encrypted)). Operation 206 depicts transmitting a level-one encrypted output of the surveillance device (e.g., transmitting (e.g., via Level One Encrypted Transmission Circuitry A104 of Skynet Level One Encryption Circuitry 110) a level-one encrypted output of the surveillance device (e.g., Level One Encrypted CCD Output 118)). Operation 208 shows the end of the depiction of the system/operational descriptions of implementations.

Referring now to FIG. 3, FIG. 2, FIG. 1Y, and FIGS. 1A-1H and FIGS. 1H-A through 1H-I, such figures illustrate system/operational descriptions of implementations. FIG. 3 shows that operation 202—accepting an output of a surveillance device—may include a number of alternate/additional component operations. Operation 300 depicts accepting an output of at least one of a visual surveillance device or an audio surveillance device (e.g., accepting (e.g., via Skynet Level One Encryption Circuitry 110) an output (e.g., digital or analog data) of at least one of a visual surveillance device (e.g., an image capture portion (e.g., video capture) of camera 102) or an audio surveillance device (e.g., a sound capture portion (e.g., microphone) of camera 102)).

Operation 302 illustrates accepting an output of at least one of a motion surveillance device or a tactile surveillance device (e.g., accepting (e.g., via Skynet Level One Encryption Circuitry 110) an output (e.g., digital or analog data) of at least one of a motion surveillance device (e.g., a commercially available motion detector (not shown)) or a tactile surveillance device ((e.g., a commercially available vibration detector (not shown)).

Operation 304 shows accepting the output of the surveillance device in a form such that the output of the surveillance device is substantially unusable absent combination with other information not present in the output of the surveillance device (e.g., accepting (e.g., via Partial Video/Audio Frame Acceptance Circuitry A106 of Skynet Level One Encryption Circuitry 110) the output of the surveillance device (e.g., camera 102) in a form such that the output of the surveillance device is substantially unusable absent combination with other information not present in the output of the surveillance device (e.g., as described in relation to FIGS. 1A-1H and FIGS. 1H-A through 1H-I, stream of CCD output 112—encrypted as a discrete unit by Skynet Level One Encryption Circuitry 110—may be in the form of a single line of a large video frame such that the single line is practicably unusable absent knowledge of a substantial portion of the video frame of which it forms a part)). Other operations of FIG. 3 depict other system/operational descriptions of implementations as described herein.

Figure 4:
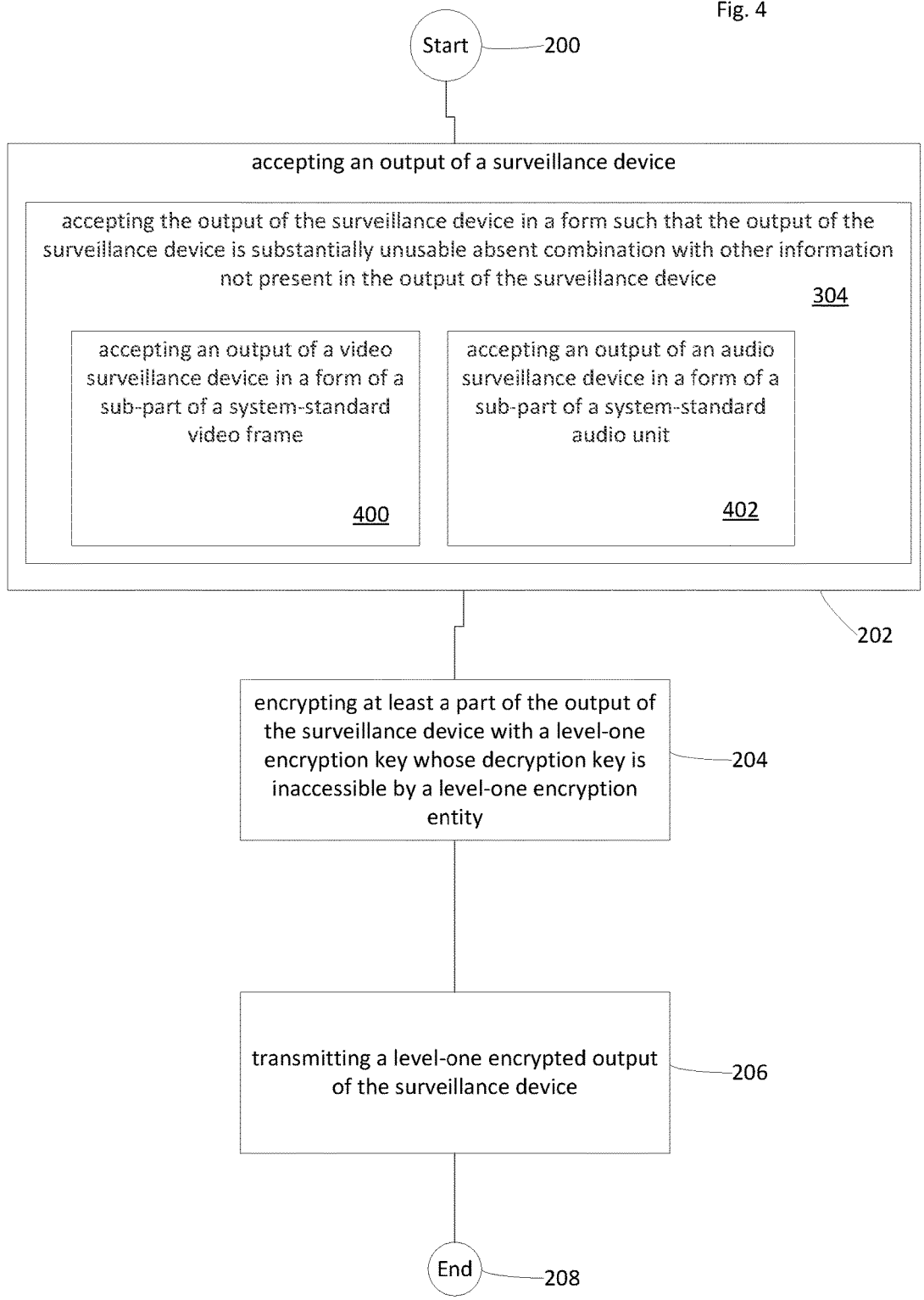

Referring now to FIG. 4, FIG. 3, and FIGS. 1A-1H and FIGS. 1H-A through 1H-I, such figures illustrate system/operational descriptions of implementations. FIG. 4 shows that operation 304—accepting the output of the surveillance device in a form such that the output of the surveillance device is substantially unusable absent combination with other information not present in the output of the surveillance device—may include a number of alternate/additional component operations. Operation 400 depicts accepting an output of a video surveillance device in a form of a sub-part of a system-standard video frame (e.g., accepting (e.g., via Partial Video/Audio Frame Acceptance Circuitry A106 of Skynet Level One Encryption Circuitry 110) an output (e.g., digital or analog data) of a video surveillance device (e.g., an image capture portion (e.g., video capture) of camera 102) in a form of a sub-part of a system-standard video frame (e.g., in a form of less than all of a system video frame such as one or more lines or sub-parts of one or more lines of a digital video frame (e.g., MPEG frame)).

Operation 402 illustrates accepting an output of an audio surveillance device in a form of a sub-part of a system-standard audio unit (e.g., via Partial Video/Audio Frame Acceptance Circuitry A106 of Skynet Level One Encryption Circuitry 110 accepting an output (e.g., digital or analog data) of an audio surveillance device in a form of a sub-part of a system-standard audio unit (e.g., a commercially available digital audio recorder) in a form of a sub-part of a system-standard audio unit (e.g., in a form of less than all of a system audio frame such as one or more frames or sub-parts of a digital audio frame (e.g., MP3 frame)).

Other operations of FIG. 4 depict other system/operational descriptions of implementations as described herein.

Figure 5:
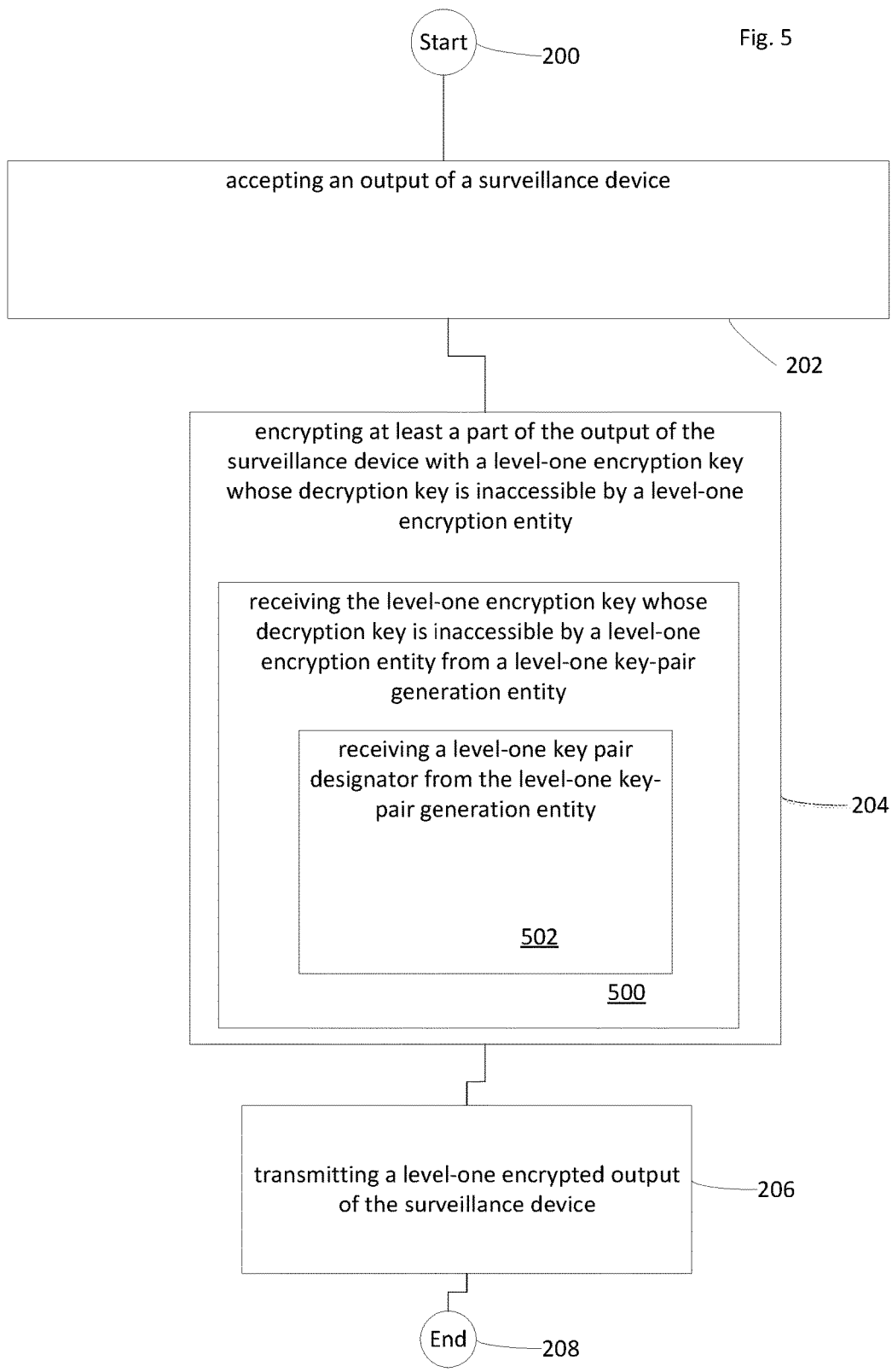

Referring now to FIG. 5, FIG. 2, and FIGS. 1A-1H and FIGS. 1H-A through 1H-I, such figures illustrate system/operational descriptions of implementations. FIG. 5 shows that operation 204—encrypting at least a part of the output of the surveillance device with a level-one encryption key whose decryption key is inaccessible by a level-one encryption entity—may include a number of alternate/additional component operations. Operation 500 depicts receiving the level-one encryption key whose decryption key is inaccessible by a level-one encryption entity from a level-one key-pair generation entity (e.g., receiving (e.g., Blind Encryption Circuitry A100 of Skynet Level One Encryption Circuitry 110 receives an encryption key, whose decryption key is inaccessible by Skynet Level One Encryption Circuitry 110, from Cyberdine-Protective-Services Key-Pair Generation Automation 114, where the Cyberdine-Protective-Services Key-Pair Generation Automation 114 is such that the decryption key that would pair with the encryption key delivered to Skynet Level One Encryption Circuitry 110 is isolated (e.g., by hardware arranged such that only encryption keys may be transmitted out to Skynet Level One Encryption Circuitry 110 (e.g., only encryption bits have lines that connect with the transmission automation "facing" Skynet Level One Encryption Circuitry 110 or by automation that securely partitions any decryption key before its corresponding encryption key is sent beyond the confines of Cyberdine-Protective-Services Key-Pair Generation Automation 114)).

FIG. 5 further illustrates that operation 500—receiving the level-one encryption key whose decryption key is inaccessible by a level-one encryption entity from a level-one key-pair generation entity—may include a number of alternate/additional component operations. Operation 502 depicts receiving a level-one key pair designator from the level-one key-pair generation entity (e.g., Level-One Key Pair Designator Reception Circuitry A108 of Skynet Level One Encryption Circuitry 110 receives along with the Cyberdine-Protective-Services Pseudo-Public Key A102 a Unique Cyberdine-Protective-Services Key Pair Designator A110 that uniquely designates the key pair, generated by Cyberdine-Protective-Services Key-Pair Generation Automation 114, of which the received encryption key A102 forms a part). Other operations of FIG. 5 depict other system/operational descriptions of implementations as described herein.

Figure 6:
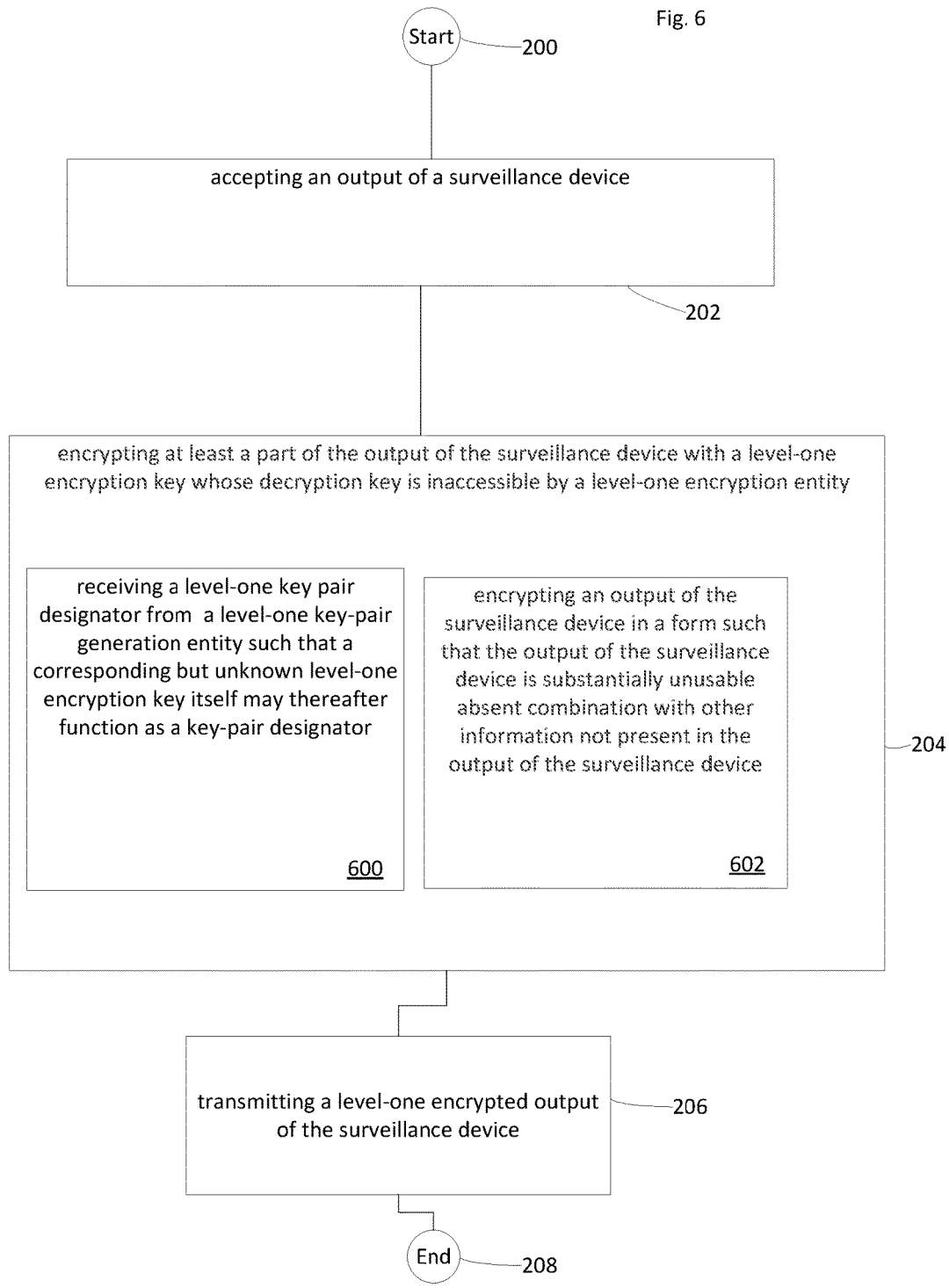

Referring now to FIG. 6, FIG. 2, and FIGS. 1A-1H and FIGS. 1H-A through 1H-I, such figures illustrate system/operational descriptions of implementations. FIG. 6 shows that operation 204—encrypting at least a part of the output of the surveillance device with a level-one encryption key whose decryption key is inaccessible by a level-one encryption entity—may include a number of alternate/additional component operations. Operation 600 depicts receiving a level-one key pair designator from a level-one key-pair generation entity such that a corresponding but unknown level-one encryption key itself may thereafter function as a key-pair designator (e.g., Level-One Key Pair Designator Reception Circuitry 108 of Skynet Level One Encryption Circuitry 110 receiving the level one encryption key A102 itself the corresponding (but unknown to Skynet Level One Encryption Circuitry 110) decryption key which will thereafter be used, like trying keys on a keychain, by separate automation (e.g., FBI Level One Decryption Circuitry 130) to find the right decryption key that unlocks the encryption key; thus allowing the encryption key to itself function as a sort of key-pair designator (e.g., such as was described in relation to FBI Name DE-Obscuring Circuitry 136 above)).

Operation 602 depicts encrypting an output of the surveillance device in a form such that the output of the surveillance device is substantially unusable absent combination with other information not present in the output of the surveillance device (e.g., Blind Encryption Circuitry A100 of Skynet Level One Encryption Circuitry 110 encrypting one or more lines or sub-parts of one or more lines of a system-standard video frame received from Partial Video/Audio Frame Acceptance Circuitry A106 where the parts encrypted would be substantially unusable by system-standard video automation absent substantially the rest of the video frame of which the one or more lines or sup-parts of one or more lines forms a part; that is, the system would need more than that "chunk" of information that was encrypted in order to for system-standard video automation to construct a useable video frame). Other operations of FIG. 6 depict other system/operational descriptions of implementations as described herein.

Figure 7:
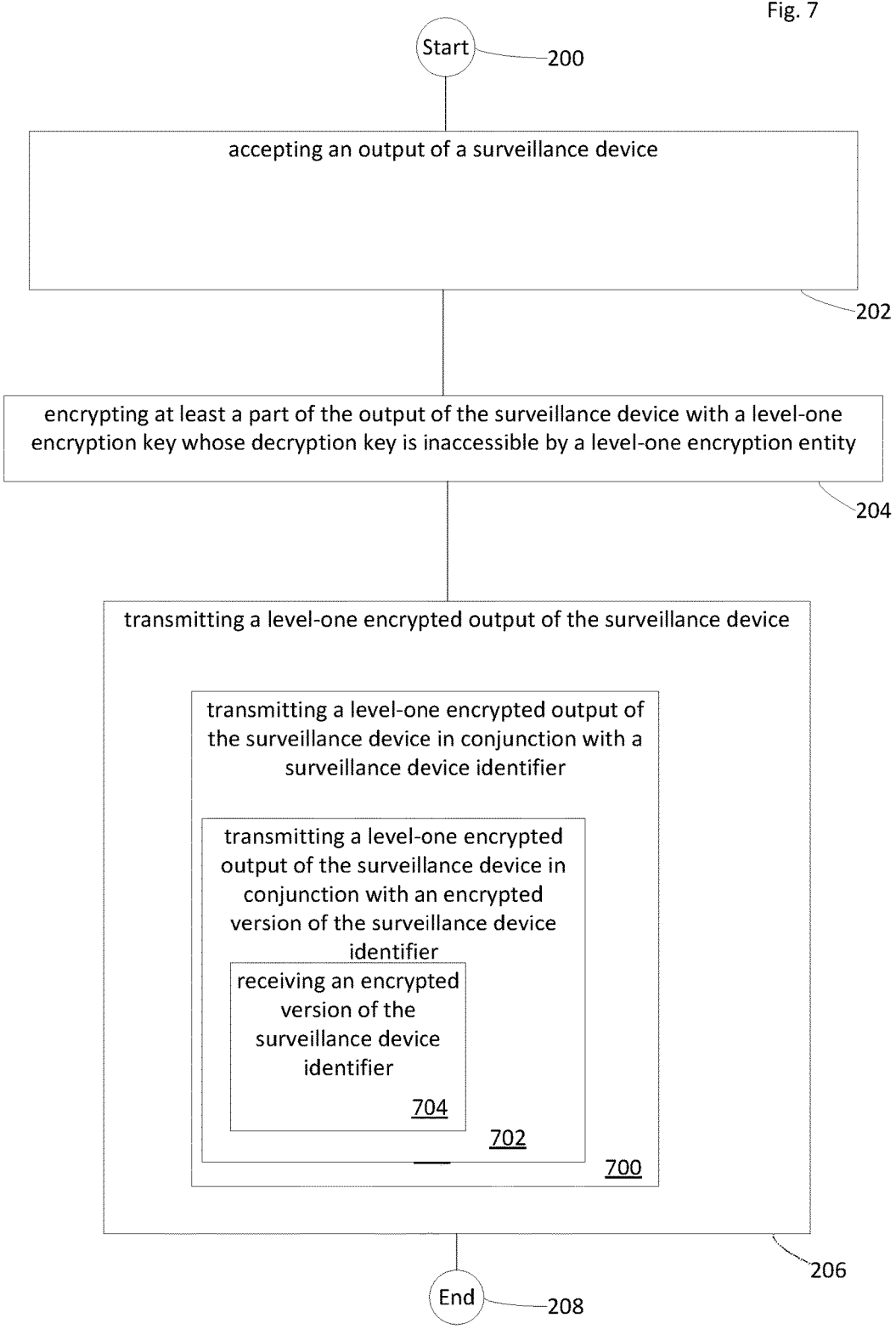

Referring now to FIG. 7, FIG. 2, FIG. 1Y, and FIGS. 1A-1H and FIGS. 1H-A through 1H-I, such figures illustrate system/operational descriptions of implementations. FIG. 7 shows that operation 206—transmitting a level-one encrypted output of the surveillance device—may include a number of alternate/additional component operations. Operation 700 depicts transmitting a level-one encrypted output of the surveillance device in conjunction with a surveillance device identifier (e.g., Level-One Encrypted Transmission Circuitry A104 of Skynet Level One Encryption Circuitry 110 transmitting Encrypted Partial Video/Audio Frame A116 (e.g., encrypted with Cyberdine-Protective Services-Pseudo-Public Encryption Key by Blind Encryption Circuitry A100 of Skynet Level One Encryption Circuitry 110), Unique Cyberdine-Protective-Services Key Pair Designator A110, and some type of surveillance device identifier (e.g., "Skynet Security Camera Alpha") to Skynet Level Two Encryption Circuitry 120).

FIG. 7 further illustrates that operation 700 transmitting a level-one encrypted output of the surveillance device in conjunction with a surveillance device identifier—may include a number of alternate/additional component operations. Operation 702 transmitting a level-one encrypted output of the surveillance device in conjunction with an encrypted version of the surveillance device identifier (e.g., Level One Encrypted Transmission Circuitry A104 of Skynet Level One Encryption Circuitry 110 transmitting an output of camera 102 that Skynet Level One Encryption Circuitry 110 has encrypted but cannot decrypt (in that the requisite decryption key is inaccessible by Skynet Level One Encryption Circuitry 110) in conjunction with an encrypted surveillance device identifier (e.g., "Encrypted-Camera- ID"—the encrypted version of "Skynet security camera alpha) produced by Skynet Name Obscuring Unit 106 and received by Skynet Level One Encryption Circuitry 110)" A114)—may include a number of alternate/additional component operations. Operation 704 depicts receiving an encrypted version of the surveillance device identifier (e.g., Level One Surveillance Device Identifier Circuit A112 of Skynet Level One Encryption Circuitry 110 receiving an encrypted identifier (e.g., Skynet Spycam Beta (not shown) from Skynet Name Obscuring Unit 106).

Figure 8:
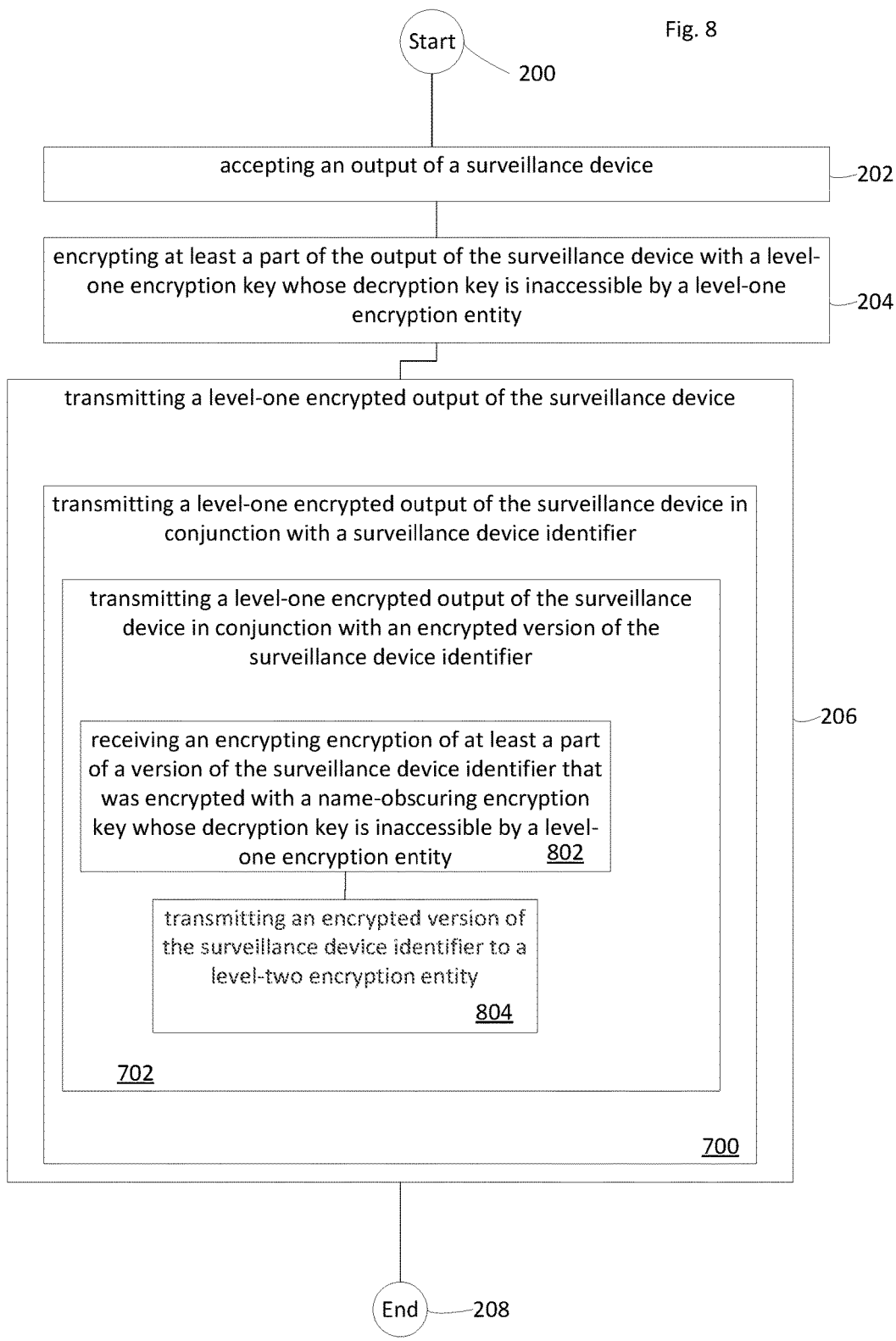

Referring now to FIG. 8, FIG. 7, FIG. 1Y, and FIGS. 1A-1H and FIGS. 1H-A through 1H-I, such figures illustrate system/operational descriptions of implementations. FIG. 8 shows that operation 702 transmitting a level-one encrypted output of the surveillance device in conjunction with an encrypted version of the surveillance device identifier—may include a number of alternate/additional component operations. Operation 802 depicts receiving an encryption of at least a part of a version of the surveillance device identifier that was encrypted with a name-obscuring encryption key whose decryption key is inaccessible by a level-one encryption entity (e.g., Skynet Level One Encryption Circuitry 110 receiving from Skynet Name Obscuring Unit 106 a version of "Skynet Security Camera Alpha" (e.g., "Encrypted-Camera-ID") that was encrypted with a pseudo public key generated by Camera-to-Obscure Co Circuitry 104 as described herein). Operation 804 depicts transmitting an encrypted version of the surveillance device identifier to a level-two encryption entity (e.g., Level-One Encrypted Transmission Circuitry A104 of Skynet Level One Encryption Circuitry 110 transmitting a version of a packet—containing "Encrypted-Camera-ID+16 Jun. 2014; Time 10:00 a.m.-11:00 a.m." linked with at least a part of CCD output 112 previously encrypted by Skynet Level One Encryption Circuitry 110 with a level-one encryption key whose decryption key is inaccessible by Skynet Level One Encryption Circuitry 110 prior to said transmitting). Other operations of FIG. 8 depict other system/operational descriptions of implementations as described herein.

Figure 9:
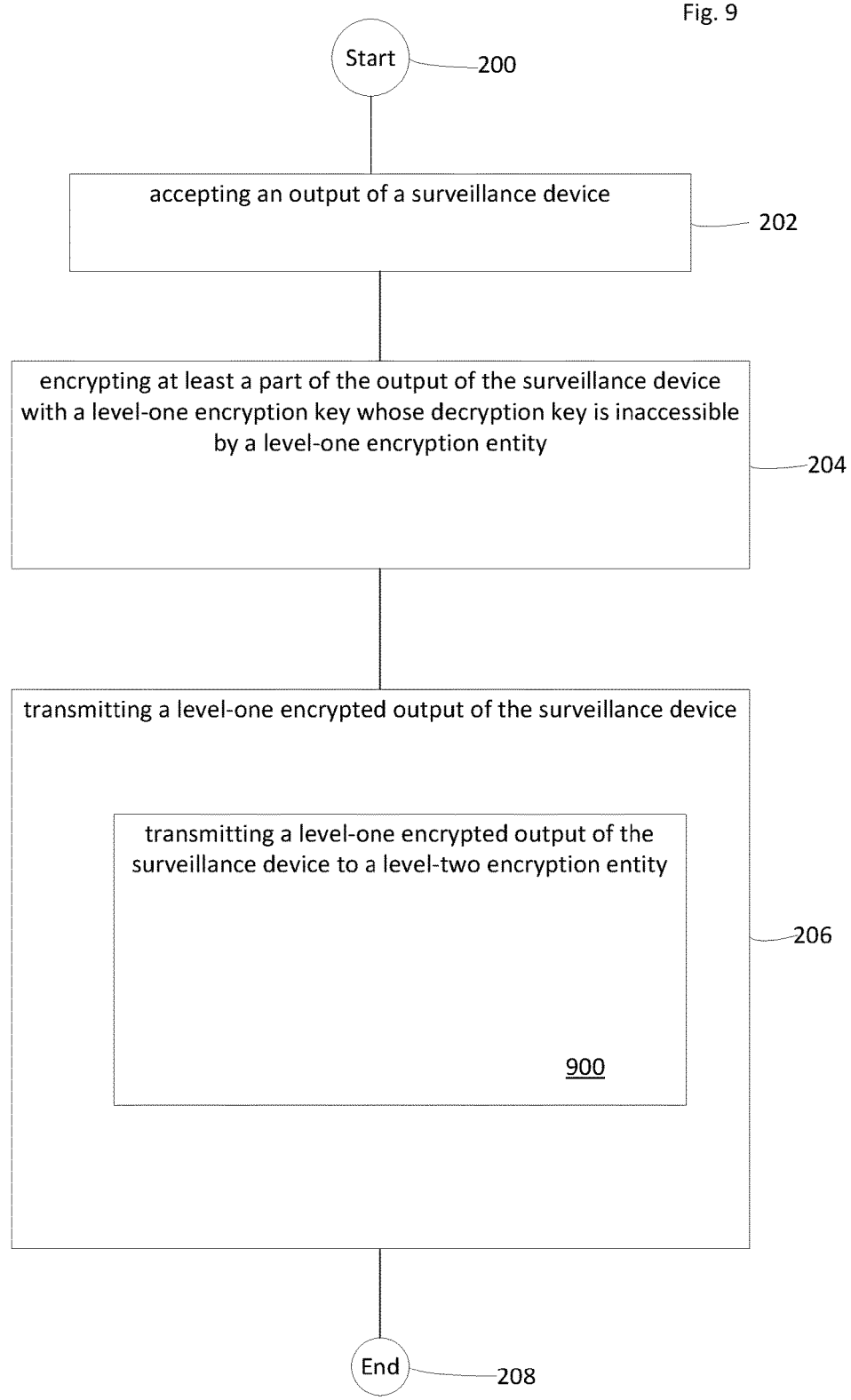

Referring now to FIG. 9, FIG. 2, and FIGS. 1A-1H and FIGS. 1H-A through 1H-I, such figures illustrate system/operational descriptions of implementations. FIG. 9 shows that operation 206 depicts transmitting a level-one encrypted output of the surveillance device may include a number of alternate/additional component operations. Operation 900 depicts transmitting a level-one encrypted output of the surveillance device to a level-two encryption entity (e.g., Level-One Encrypted Transmission Circuitry of Skynet Level One Encryption Circuitry 110 transmitting Level One Encrypted CCD output 118 of Camera 102 to Skynet Level Two Encryption Circuitry 120). Other operations of FIG. 9 depict other system/operational descriptions of implementations as described herein.

IV. Implementations May be Context Dependent

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

V. Tools Allowing Automated/Mechanical Transition from Higher Level Instructions to Circuitry And/or Direct Circuitry Implementations In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operation described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, Verizon, AT&T, etc.), or (g) a wired/wireless services entity (e.g., Sprint, AT&T, Verizon, etc.), etc.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A machine comprising:
   level-one encryption circuitry adapted to interface with at least one surveillance device, wherein level-one encryption circuitry adapted to interface with at least one surveillance device includes, at least:
      said level-one encryption circuitry adapted to receive from the at least one surveillance device at least one output of the at least one surveillance device, wherein level-one encryption circuitry adapted to receive from the at least one surveillance device at least one output of the at least one surveillance device includes, at least:
         said level-one encryption circuitry adapted to receive from the at least one surveillance device an encrypted output that is associated with fragmentation of a data-communications standard by fragmentation automation;
      said level-one encryption circuitry adapted to interface with level-one key-pair generation automation;
      said level-one encryption circuitry associated with level-one blind encryption circuitry; and
      said level-one encryption circuitry adapted to interface with level-two encryption circuitry.

2. The machine of claim 1, wherein level-one encryption circuitry adapted to receive from the at least one surveillance device at least one output of the at least one surveillance device comprises:
   said level-one encryption circuitry adapted to receive from the at least one surveillance device an output of a surveillance device that is associated with data that cannot be decrypted under a standard associated with the at least one surveillance device.

3. The machine of claim 1, wherein level-one encryption circuitry adapted to receive from the at least one surveillance device at least one output of the at least one surveillance device comprises:
   said level-one encryption circuitry adapted to receive from the at least one surveillance device an output of a surveillance device that is associated with fragmentation of a useable unit into a unusable unit.

4. The machine of claim 1, wherein level-one encryption circuitry adapted to receive from the at least one surveillance device at least one output of the at least one surveillance device comprises:
   said level-one encryption circuitry adapted to receive from the at least one surveillance device an output of at least one of an image surveillance device, an audio surveillance device, a motion surveillance device, or a tactile surveillance device.

5. The machine of claim 1, wherein level-one encryption circuitry adapted to receive from the at least one surveillance device an encrypted output that is associated with fragmentation of a data-communications standard by fragmentation automation comprises:
   said level-one encryption circuitry adapted to receive from the at least one surveillance device an encrypted output that is associated with fragmentation automation that renders an industry-standard video packet unusable absent a priori knowledge of a fragmentation technique used to fragment the video packet.

6. The machine of claim 1, wherein level-one encryption circuitry adapted to receive from the at least one surveillance device an encrypted output that is associated with fragmentation of a data-communications standard by fragmentation automation comprises:
   said level-one encryption circuitry adapted to receive from the at least one surveillance device an encrypted output that is associated with fragmentation automation that renders an industry-standard audio packet unusable absent a priori knowledge of a fragmentation technique used to fragment the audio.

7. The machine of claim 1, wherein level-one encryption circuitry associated with level-one blind encryption circuitry comprises:
   said level-one blind encryption circuitry adapted to interface with level-one key-pair designator reception circuitry.

8. The machine of claim 7, wherein level-one key-pair designator reception circuitry comprises:
   said level-one key-pair designator reception circuitry adapted to store/utilize a level-one encryption key generated by the level-one key-pair generation automation.

9. The machine of claim 7, wherein level-one key-pair designator reception circuitry comprises:
   said level-one key-pair designator reception circuitry adapted to store/utilize a unique level-one key-pair designator generated by the level-one key-pair generation automation.

10. The machine of claim 1, wherein level-one encryption circuitry comprises:
    level-one encrypted transmission circuitry adapted to interface with level-one surveillance device identifier circuitry.

11. A machine comprising:
    level-one encryption circuitry adapted to interface with at least one surveillance device;
    said level-one encryption circuitry adapted to interface with level-one key-pair generation automation;

said level-one encryption circuitry associated with level-one blind encryption circuitry;
said level-one encryption circuitry adapted to interface with level-two encryption circuitry; and
wherein level-one encryption circuitry includes, at least:
  level-one encrypted transmission circuitry coupled with level-one surveillance device identifier circuitry, wherein level-one surveillance device identifier circuitry includes, at least:
    said level-one surveillance device identifier circuitry adapted to receive an encrypted surveillance device identifier.

12. A machine comprising:
level-one encryption circuitry adapted to interface with at least one surveillance device;
said level-one encryption circuitry adapted to interface with level-one key-pair generation automation;
said level-one encryption circuitry associated with level-one blind encryption circuitry, wherein level-one encryption circuitry associated with level-one blind encryption circuitry includes, at least:
  said level-one blind encryption circuitry adapted to interface with the level-one key-pair generation automation, wherein level-one blind encryption circuitry adapted to interface with the level-one key-pair generation automation includes, at least:
    said level-one blind encryption circuitry adapted to receive from the level-one key-pair generation automation a level-one encryption key whose decryption key is inaccessible by a level-one encryption entity, wherein level-one blind encryption circuitry adapted to receive from the level-one key-pair generation automation a level-one encryption key whose decryption key is inaccessible by a level-one encryption entity includes, at least:
      said level-one blind encryption circuitry adapted to receive a level-one key pair designator from the level-one key-pair generation automation
said level-one encryption circuitry adapted to interface with level-two encryption circuitry.

13. The machine of claim 12, wherein level-one blind encryption circuitry adapted to receive a level-one key pair designator from the level-one key-pair generation automation comprises:
said level-one blind encryption circuitry adapted to receive from the level-one key pair designator reception circuitry a level-one key pair designator in the form of a level-one encryption key that may thereafter function as the level-one key-pair designator.

14. The machine of claim of 12, wherein level-one blind encryption circuitry adapted to receive a level-one key pair designator from the level-one key-pair generation automation comprises:
said level-one blind encryption circuitry constructed to encrypt at least a part of an output of the surveillance device into a form such that a level-one encrypted output of the surveillance device is unusable absent combination with other information not present in the level-one encrypted output of the surveillance device.

15. The machine of claim 14, wherein level-one blind encryption circuitry constructed to encrypt at least a part of an output of the surveillance device into a form such that a level-one encrypted output of the surveillance device is unusable absent combination with other information not present in the level-one encrypted output of the surveillance device comprises:

said level-one blind encryption circuitry adapted to receive from the level-one key pair designator reception circuitry a level-one encryption key whose decryption key is inaccessible by a level-one encryption entity, the level-one key pair designator reception circuitry adapted to receive the level-one encryption key whose decryption key is inaccessible by the level-one encryption entity from level-one key-pair generation automation.

16. The machine of claim 14, wherein level-one blind encryption circuitry constructed to encrypt at least a part of an output of the surveillance device into a form such that a level-one encrypted output of the surveillance device is unusable absent combination with other information not present in the level-one encrypted output of the surveillance device comprises:
said level-one blind encryption circuitry adapted to interface with the level-one key-pair generation automation to receive a level-one key pair designator.

17. The machine of claim 12, wherein level-one encryption circuitry associated with level-one blind encryption circuitry comprises:
said level-one blind encryption circuitry adapted to interface with the level-one key-pair generation automation to receive a level-one key pair designator in the form of a level-one encryption key that may thereafter function as the level-one key-pair designator.

18. A machine comprising:
level-one encryption circuitry adapted to interface with at least one surveillance device;
said level-one encryption circuitry adapted to interface with level-one key-pair generation automation;
said level-one encryption circuitry associated with level-one blind encryption circuitry; and
said level-one encryption circuitry adapted to interface with level-two encryption circuitry, wherein level-one encryption circuitry adapted to interface with level-two encryption circuitry includes, at least:
  said level-one encryption circuitry adapted to interface with the level-two encryption circuitry such that a level-one encrypted output of a surveillance device may be transmitted, wherein level-one encryption circuitry adapted to interface with the level-two encryption circuitry such that a level-one encrypted output of a surveillance device may be transmitted includes, at least:
    said level-one encryption circuitry adapted to interface with the level-two encryption circuitry such that the level-one encrypted output of the surveillance device in conjunction with a surveillance device identifier may be transmitted.

19. The machine of claim 18, wherein level-one encryption circuitry adapted to interface with the level-two encryption circuitry such that the level-one encrypted output of the surveillance device in conjunction with a surveillance device identifier may be transmitted comprises:
said level-one encryption circuitry adapted to interface with the level-two encryption circuitry such that the level-one encrypted output of the surveillance device in conjunction with an encrypted version of the surveillance device identifier may be transmitted.

20. The machine of claim 19, wherein level-one encryption circuitry adapted to interface with the level-two encryption circuitry such that the level-one encrypted output of the surveillance device in conjunction with an encrypted version of the surveillance device identifier may be transmitted comprises:

level-one surveillance device identifier circuitry adapted to interface with the at least one surveillance device to receive an encrypted version of the surveillance device identifier.

21. The machine of claim 19, wherein level-one encryption circuitry adapted to interface with the level-two encryption circuitry such that the level-one encrypted output of the surveillance device in conjunction with an encrypted version of the surveillance device identifier may be transmitted comprises:
said level-one encryption circuitry adapted to interface with a name obscuring unit to:
receive an encryption of at least a part of a version of the surveillance device identifier that was encrypted with a name-obscuring encryption key whose decryption key is inaccessible by the name obscuring unit; and
transmit an encrypted version of the surveillance device identifier to the level-two encryption circuitry.

22. The machine of claim 18, wherein level-one encryption circuitry comprises:
said level-one blind encryption circuitry constructed with level-one encrypted transmission circuitry adapted to interface with the level-two encryption circuitry to transmit a level-one encrypted output of the surveillance device to the level-two encryption circuitry.

23. The machine of claim 18, wherein the machine further comprises:
at least one of static or sequenced hardware elements.

24. The machine of claim 18, wherein the machine further comprises:
at least one ordered matter element.

25. The machine of claim 24, wherein at least one ordered matter element further comprises:
at least one logic gate.

26. The machine of claim 25, wherein at least one logic gate further comprises:
at least one physical device that may be driven to change physical state in order to create a physical reality of Boolean logic.

27. The machine of claim 24, wherein at least one ordered matter element further comprises:
at least one logic circuit.

28. The machine of claim 27, wherein at least one logic circuit further comprises:
one or more physical logic gates that may be arranged to form physical logic circuits that may be driven to create a physical reality of one or more logical functions.

29. The machine of claim 28, wherein one or more physical logic gates that may be arranged to form physical logic circuits that may be driven to create a physical reality of one or more logical functions further comprises:
at least one of a multiplexer, a latch, or a register.

30. The machine of claim 28, wherein one or more physical logic gates that may be arranged to form physical logic circuits that may be driven to create a physical reality of one or more logical functions further comprises:
at least one of an arithmetic logic unit, a computer memory, or a bridge.

31. The machine of claim 28, wherein one or more physical logic gates that may be arranged to form physical logic circuits that may be driven to create a physical reality of one or more logical functions further comprises:
at least one central processing unit.

32. The machine of claim 28, wherein one or more physical logic gates that may be arranged to form physical logic circuits that may be driven to create a physical reality of one or more logical functions further comprises:
at least one configuration responsive to a defined Instruction Set Architecture.

33. The machine of claim 28, wherein one or more physical logic gates that may be arranged to form physical logic circuits that may be driven to create a physical reality of one or more logical functions further comprises:
at least one circuit constructed to convert a machine language instruction to at least one of a voltage control, a timing control, a selection control, or an activation control.

34. The machine of claim 24, wherein at least one ordered matter element further comprises:
at least one integrated electrical circuit.

35. The machine of claim 24, wherein at least one ordered matter element further comprises:
at least one application specific integrated electrical circuit.

36. The machine of claim 24, wherein at least one ordered matter element further comprises:
at least one general purpose computer configured by a computer program.

37. The machine of claim 36, wherein at least one general purpose computer configured by a computer program further comprises:
at least one general purpose computer processor operably coupled with a hardware memory having at least a part of the computer program.

* * * * *